(12) United States Patent
Hagiwara et al.

(10) Patent No.: US 9,075,370 B2
(45) Date of Patent: Jul. 7, 2015

(54) COLOR IMAGE FORMING APPARATUS

(75) Inventors: Hiroshi Hagiwara, Suntou-gun (JP);
Takamitsu Soda, Mishima (JP);
Akinobu Hirayama, Mishima (JP);
Hiromitsu Kumada, Susono (JP);
Yoshiko Kubo, Susono (JP); Takateru Ohkubo, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 13/531,984

(22) Filed: Jun. 25, 2012

(65) Prior Publication Data

US 2013/0004204 A1 Jan. 3, 2013

(30) Foreign Application Priority Data

Jun. 30, 2011 (JP) ................. 2011-146194

(51) Int. Cl.
*G03G 15/01* (2006.01)
*G03G 15/00* (2006.01)
*G03G 15/045* (2006.01)
*G03G 15/043* (2006.01)
*H04N 1/50* (2006.01)
*G03G 21/08* (2006.01)

(52) U.S. Cl.
CPC ........ *G03G 15/5033* (2013.01); *G03G 15/5037* (2013.01); *G03G 15/045* (2013.01); *G03G 15/043* (2013.01); *G03G 15/5058* (2013.01); *H04N 1/506* (2013.01); *G03G 21/08* (2013.01); *G03G 15/0131* (2013.01); *G03G 15/0189* (2013.01); *G03G 2215/00059* (2013.01); *G03G 2215/0132* (2013.01); *G03G 2215/0161* (2013.01)
USPC .............................. 399/301; 399/128; 399/186

(58) Field of Classification Search
CPC ............. G03G 15/045; G03G 15/047; G03G 15/5037; G03G 21/08; G03G 21/0094
USPC ........................................ 399/128, 186, 301
See application file for complete search history.

(56) References Cited

U.S. PATENT DOCUMENTS

| 6,233,413 | B1 * | 5/2001 | Folkins | ......................... 399/71 |
| 2007/0140714 | A1 | 6/2007 | Kurita | |
| 2008/0170870 | A1 * | 7/2008 | Yamaguchi et al. | ............ 399/49 |
| 2009/0169227 | A1 * | 7/2009 | Kanai et al. | ..................... 399/50 |

(Continued)

FOREIGN PATENT DOCUMENTS

| CN | 1637653 A | 7/2005 |
| EP | 1122079 A2 | 8/2001 |
| JP | 7-234612 A | 9/1995 |

*Primary Examiner* — Benjamin Schmitt
(74) *Attorney, Agent, or Firm* — Canon U.S.A., Inc. IP Division

(57) ABSTRACT

An image forming apparatus includes a process unit arranged in the vicinity of the circumference of each photosensitive member and the process unit is configured to act on the photosensitive member in forming a toner image thereon. The image forming apparatus detects a time period since a laser beam emission unit emits a laser beam to the photosensitive member to form an electrostatic latent image for detection until the formed electrostatic latent image for detection or a toner image based on the electrostatic latent image for detection reaches the process unit, and performs color misregistration correction control based on the result of detection. In this case, a control unit at least decreases the light amount of a pre-exposure LED when the electrostatic latent image for detection passes through a position facing the pre-exposure LED.

8 Claims, 15 Drawing Sheets

(56) References Cited

U.S. PATENT DOCUMENTS

2010/0008687 A1* 1/2010 Ishii .............................. 399/55
2010/0209124 A1* 8/2010 Mizutani et al. ................ 399/16
2012/0003016 A1* 1/2012 Uchiyama et al. ............ 399/301

* cited by examiner

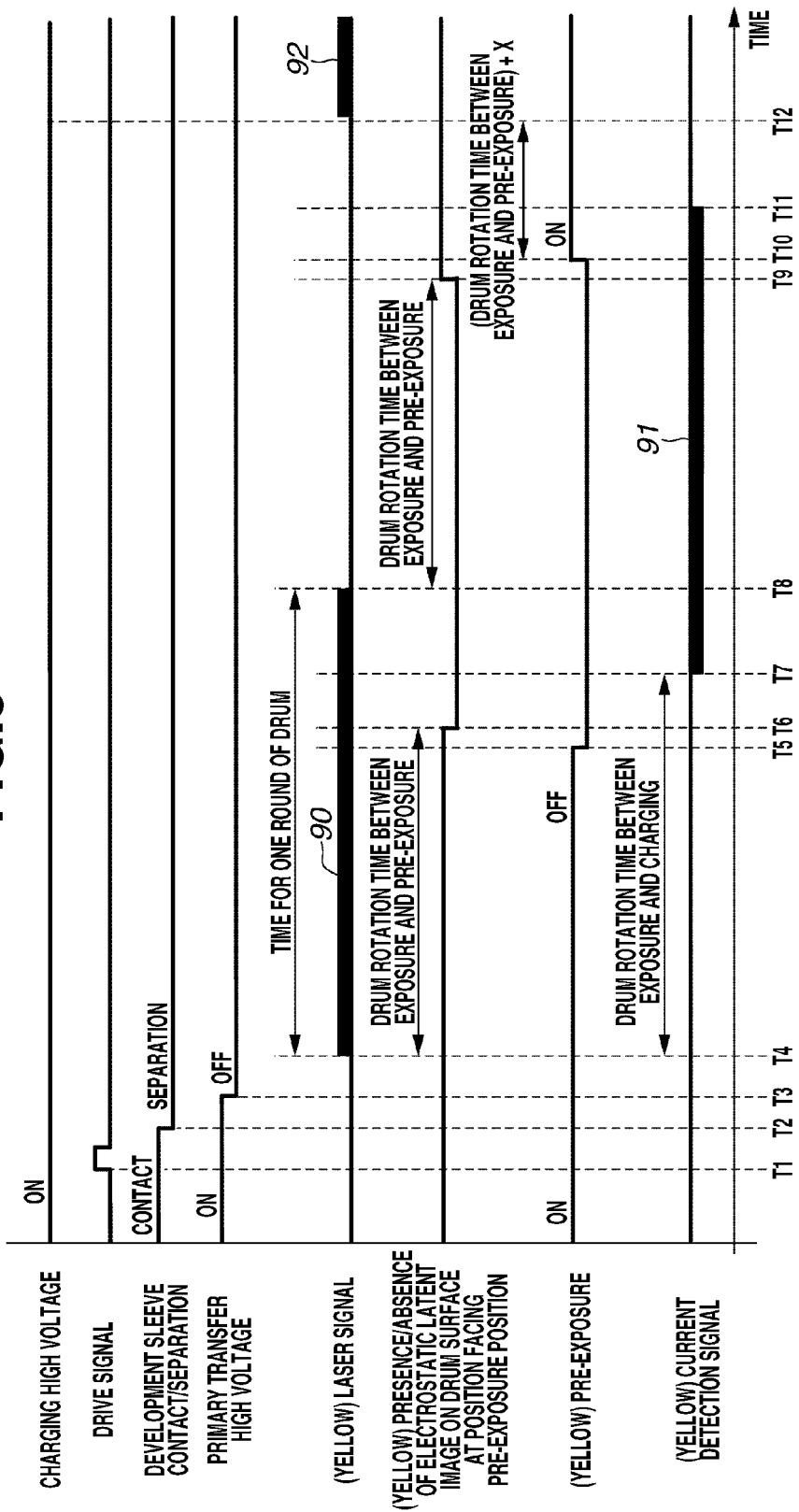

| | |
|---|---|
| ⊕ −700 V | AFTER CHARGING |
| ⬢ −50 V | AFTER PRE-EXPOSURE |
| ▲ −100~−700 V | AFTER EXPOSURE (ELECTROSTATIC LATENT IMAGE 90) |
| △ −650~−700 V | AFTER CHARGING (WITHOUT PRE-EXPOSURE) |

TIME: T4

TIME: T5

TIME: T6

TIME: T7

TIME: T8

TIME: T9

TIME: T10

TIME: T11

TIME: T12

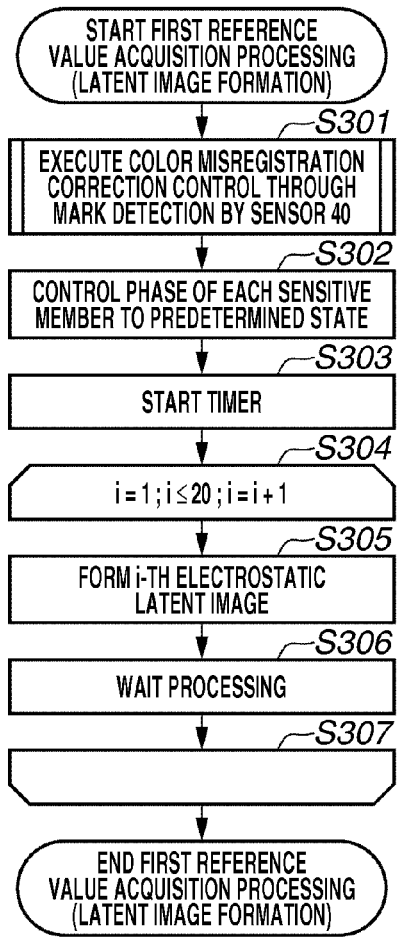
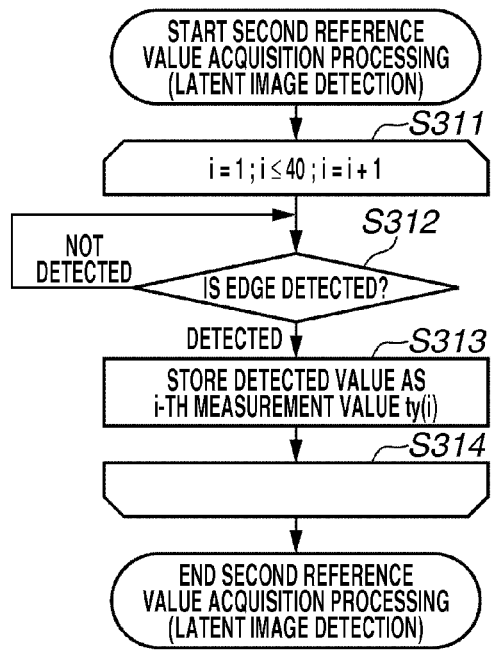
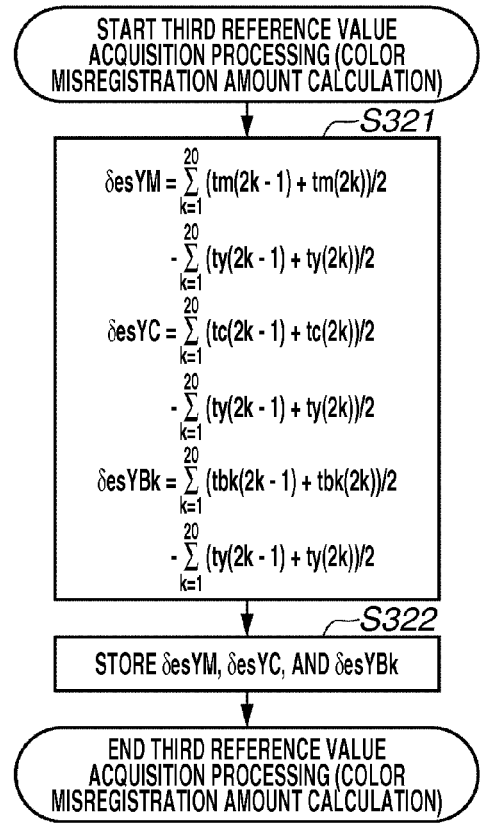

WITH NO TONER ADHERING TO
ELECTROSTATIC LATENT IMAGE 80

WITH TONER ADHERING TO
ELECTROSTATIC LATENT IMAGE 80

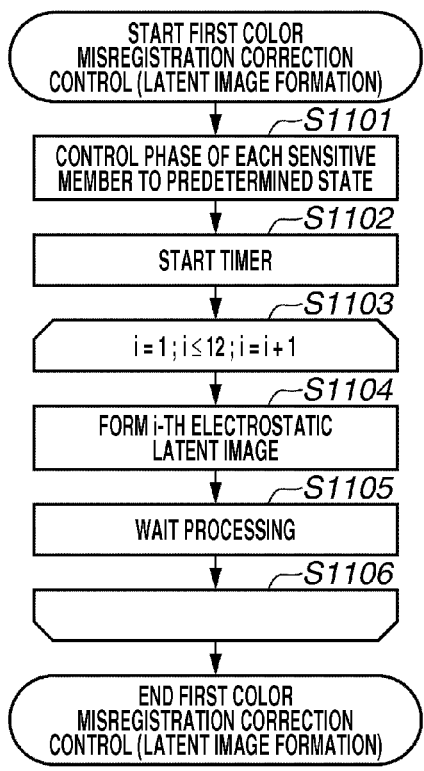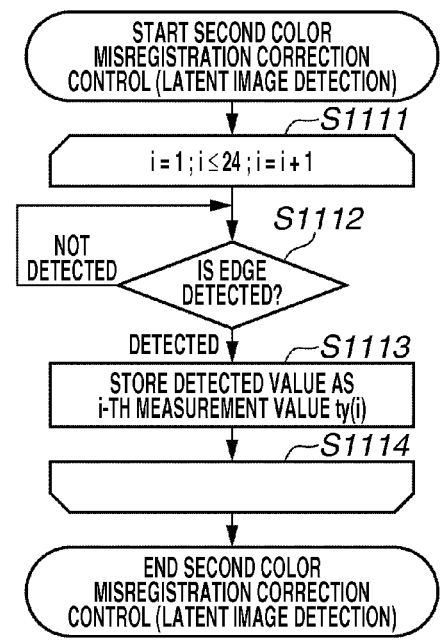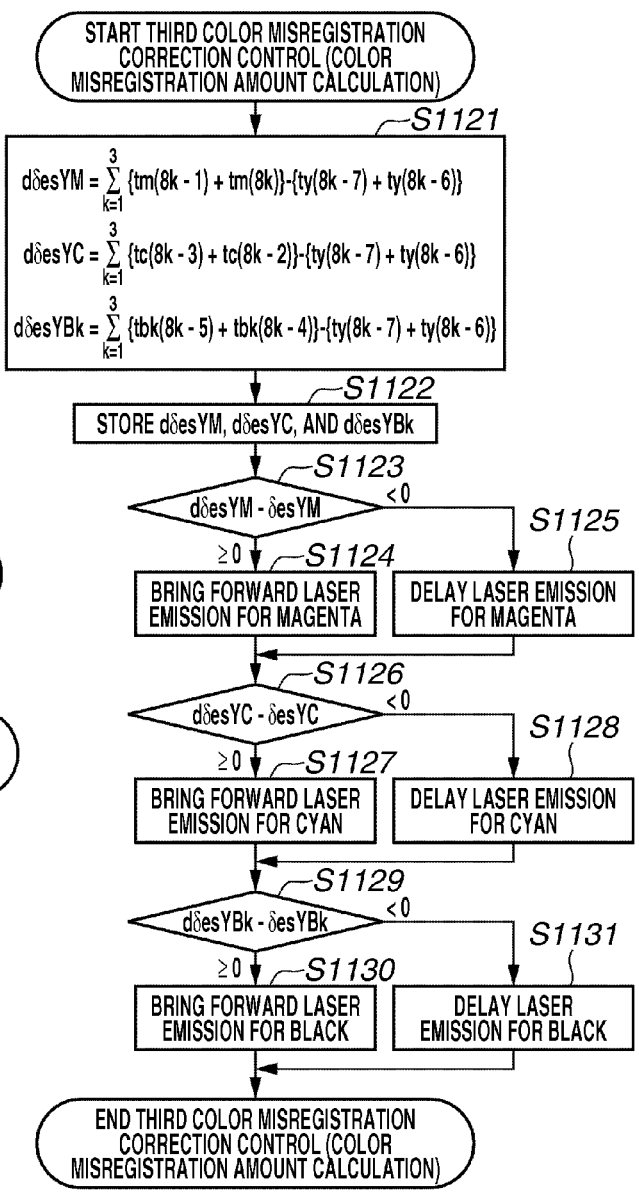

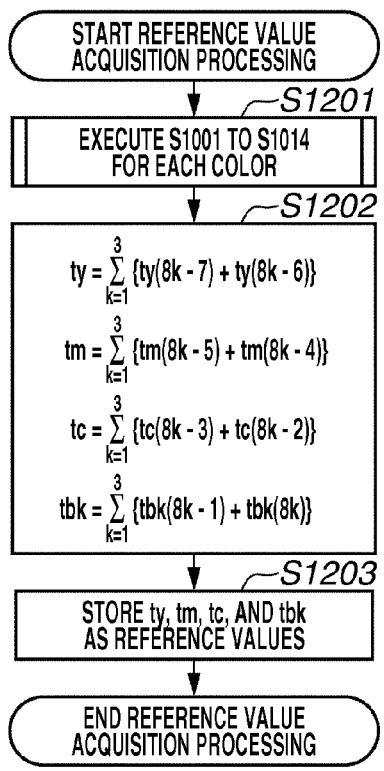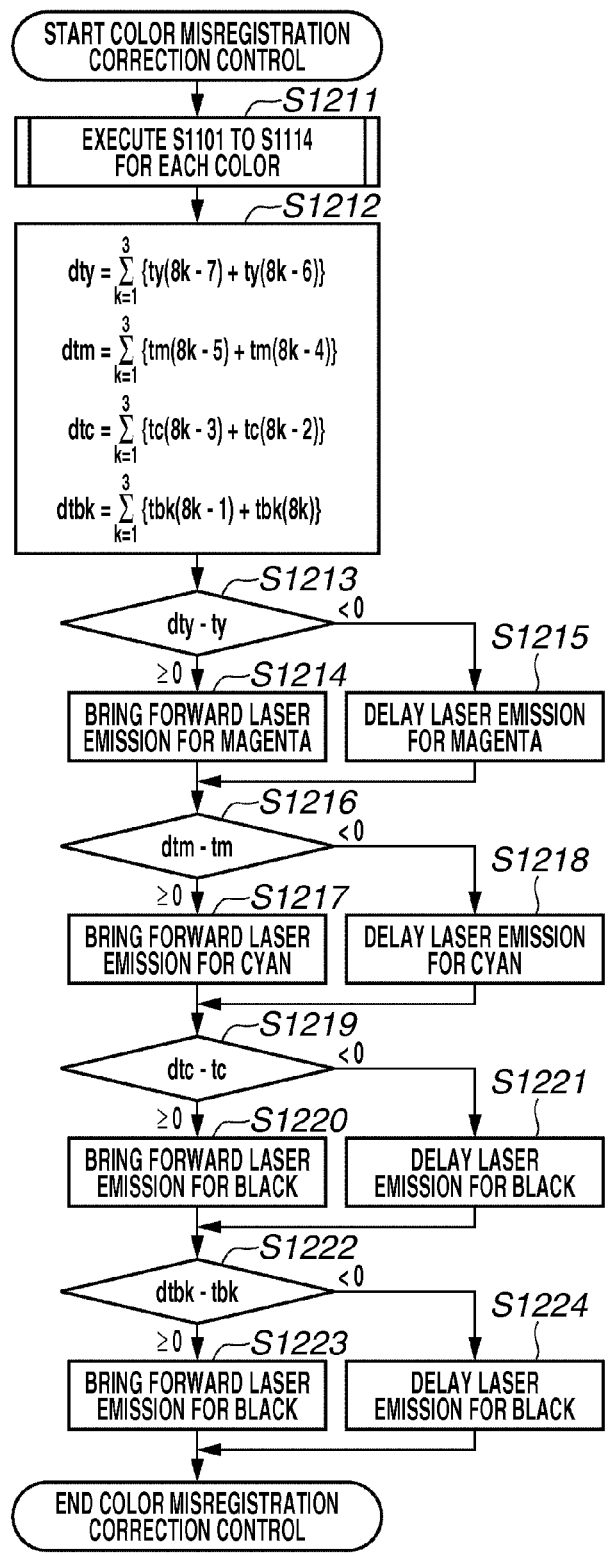

COLOR IMAGE FORMING APPARATUS

BACKGROUND OF THE INVENTION

1. Field of the Invention

The present invention relates to a color image forming apparatus employing the electrophotographic process and more particularly to an image forming apparatus capable of forming an electrostatic latent image.

2. Description of the Related Art

A tandem-type color image forming apparatus employing the electrophotographic process is known to include independent image forming units for respective colors to achieve high speed printing. With the tandem-type color image forming apparatus, images are sequentially transferred from respective color image forming units onto an intermediate transfer belt, and then collectively transferred from the intermediate transfer belt onto a recording medium.

Such a color image forming apparatus, when images are superimposed, produces color misregistration (positional deviation) due to mechanical factors in respective color image forming units. Particularly when a laser scanner (optical scanner apparatus) and a photosensitive drum are independently provided for each color image forming unit, a positional relation between the laser scanner and the photosensitive drum differs for each color. As a result, it becomes impossible to synchronize laser scanning positions on respective photosensitive drums, producing color misregistration.

To correct such color misregistration, the above-described color image forming apparatus applies color misregistration correction control. Japanese Patent Application Laid-Open No. 7-234612 discusses color misregistration correction control in which toner images for detecting respective colors (hereinafter referred to as toner images for detection) are transferred from photosensitive drums onto an image bearing member (intermediate transfer belt), and relative positions of the toner images for detection in the scanning and conveyance directions are detected by using optical sensors.

However, there has been the following problem in conventionally known color misregistration correction control in which toner images for detection are detected by using optical sensors. Specifically, since toner images (100%-density) for detection in color misregistration correction control are applied to the photosensitive drums and the image bearing member (belt), it takes time and effort for cleaning, resulting in reduced usability of the image forming apparatus.

SUMMARY OF THE INVENTION

The present invention is directed to resolving the above-described problem in conventional detection of toner images for detection by using optical sensors to provide an image forming apparatus with usability.

According to an aspect of the present invention, a color image forming apparatus including an image forming unit provided, the image forming unit includes a rotating photosensitive member, a charging unit configured to charge the photosensitive member, a light irradiation unit configured to perform light irradiation to form an electrostatic latent image on the photosensitive member, a development unit configured to apply toner to the electrostatic latent image to form a toner image on the photosensitive member, and a transfer unit configured to transfer the toner image adhering to the photosensitive member onto a belt, the color image forming apparatus includes a pre-exposure unit configured to be arranged on the downstream side of the transfer unit and to irradiate the photosensitive member surface before being charged by the charging unit with light, a forming unit configured to control the light irradiation unit to form an electrostatic latent image for color misregistration correction on the photosensitive member, a power supply unit configured to be of the charging unit associated with the photosensitive member, a detection unit configured to, when the electrostatic latent image for color misregistration correction that is formed on a photosensitive member passes through a position facing the charging unit, detect an output of the power supply unit, a color misregistration correction control unit configured to perform, based on the result of detection by the detection unit, color misregistration correction control so as to return a color misregistration state to a reference state; and a light amount control unit configured to, when the electrostatic latent image for color misregistration correction passes through a position facing the pre-exposure unit and before the electrostatic latent image for color misregistration correction passes through the position facing the charging unit, at least decrease the light emission amount of the pre-exposure unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a timing chart related to electrostatic latent image formation for color misregistration detection (color misregistration correction).

FIGS. 5A to 5C are flowcharts illustrating processing for reference value acquisition.

FIGS. 13A to 13C are flowcharts illustrating processing for color misregistration correction control in the image forming apparatus having a common ammeter.

FIG. 14A is a flowchart illustrating processing for another reference value acquisition in the charging high-voltage power supply having a common ammeter, and FIG. 14B is a flowchart illustrating processing for another color misregistration correction control by the charging high-voltage power supply having a common ammeter.

DESCRIPTION OF THE EMBODIMENTS

Various exemplary embodiments, features, and aspects of the invention will be described in detail below with reference to the drawings.

Exemplary embodiments of the present invention will be illustratively described in detail below with reference to the accompanying drawings. However, components described in the exemplary embodiments are to be considered as illustrative and not restrictive of the scope of the present invention.

Figure 1:
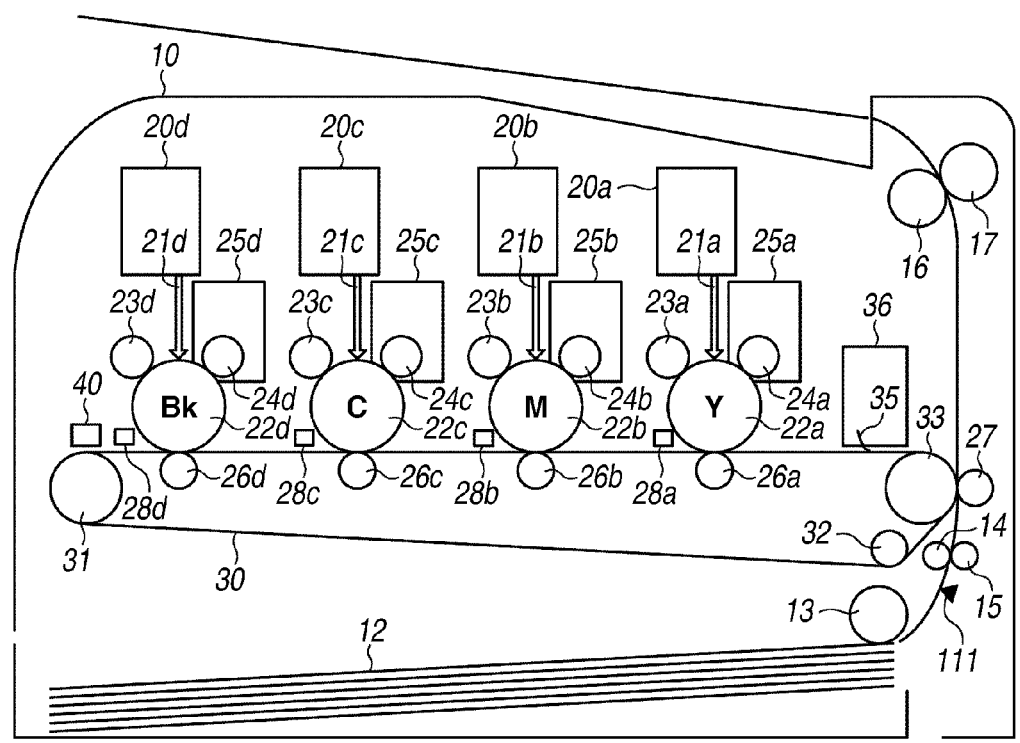
FIG. 1 is a block diagram illustrating a tandem-type (4-drum type) color image forming apparatus.

A first exemplary embodiment will be described below. FIG. 1 is a block diagram illustrating a tandem-type (4-drum type) color image forming apparatus 10. A recording medium 12 is sent out by a pickup roller 13. After the leading edge position of the recording medium 12 is detected by a resist sensor 111, the conveyance of the recording medium 12 is at once stopped at a position where the leading edge has slightly passed conveyance roller pairs 14 and 15.

Meanwhile, scanner units 20a to 20d, each including a reflection mirror and a laser diode (light emitting element), sequentially irradiate photosensitive drums 22a to 22d (rotatably driven photosensitive members) with laser beams 21a to 21d, respectively. In this case, the photosensitive drums 22a to 22d are preliminarily charged by charging rollers 23a to 23d, respectively. Each charging roller outputs, for example a voltage of −1200 V, and the photosensitive drum surfaces are charged, for example, to −700 V. When electrostatic latent images are formed on the photosensitive members by the radiation of the laser beams 21a to 21d with the photosensitive drum surfaces charged to −700 V, the potential of positions where electrostatic latent images are formed is, for example, −100 V. Developing units 25a to 25d (developing sleeves 24a to 24d) output, for example, a voltage of −350 V to apply toner to electrostatic latent images on the photosensitive drums 22a to 22d to form toner images thereon. Primary transfer rollers 26a to 26d output, for example, a positive voltage of +1000 V to transfer the toner images from the photosensitive drums 22a to 22d to an intermediate transfer belt 30 (endless belt). Pre-exposure light emitting diodes (LEDs) 28a to 28d uniformly irradiate the photosensitive drum surfaces (before charging) with light to uniformly equalize to, for example, −50 V from a state where the photosensitive drum surfaces are charged to various potentials by the presence or absence of electrostatic latent images. As illustrated in FIG. 1, the pre-exposure LEDs 28a to 28d are arranged on the downstream side of respective primary transfer rollers 26a to 26d, and on the upstream side of respective charging rollers 23a to 23d. The above-described pre-exposure units may be referred to also as pre-light irradiation units. When the photosensitive drum surfaces are charged again by the charging rollers 23a to 23d, only portions where electrostatic latent images were formed immediately before can be charged to, for example, −650 V. The above-described pre-exposure units prevent toner from adhering by a potential difference between a portion where an electrostatic latent image was formed immediately before and a portion where it was not.

Members directly related to toner image formation, such as the scanner units 20a to 20d, the photosensitive drums 22a to 22d, the charging rollers 23a to 23d, the developing units 25a to 25d, and the primary transfer rollers 26a to 26d are collectively referred to as an image forming unit. The scanner units 20a to 20d may not be included in the image forming unit depending on case. Further, members arranged in the proximity of the circumference of the photosensitive drums 22a to 22d to act thereon, such as the charging rollers 23a to 23d, the developing units 25a to 25d, and the primary transfer rollers 26a to 26d, are referred to as a process unit. A plurality of types of members may be corresponded to the process unit.

The intermediate transfer belt 30 is driven to circulate by rollers 31, 32, and 33 to convey a toner image to the position of a secondary transfer roller 27. In this case, the conveyance of the recording medium 12 is restarted at a timing synchronized with the conveyed toner image at the secondary transfer position of the secondary transfer roller 27. Then, the toner image is transferred from the intermediate transfer belt 30 onto a recording material (the recording medium 12) by the secondary transfer roller 27.

Heat is applied to the toner image by fixing roller pairs 16 and 17 to fix the toner image of the recording medium 12 onto the recording medium 12. Then, the recording medium 12 is discharged to the outside of the apparatus. In this case, toner that has not been transferred from the intermediate transfer belt 30 onto the recording medium 12 by the secondary transfer roller 27 is collected into a waste toner container 36 by a cleaning blade 35. The operation of a color misregistration detection sensor 40 which performs toner image detection will be described below. Alphabetic characters a, b, c, and d supplied to reference numerals indicate that a relevant component and unit relate to yellow, magenta, cyan, and black, respectively.

A light irradiation system using the scanner units 20a to 20d has specifically been described with reference to FIG. 1. However, the configuration is not limited thereto. For example, an image forming apparatus having a LED array as a light irradiation unit may be applied to the following exemplary embodiments as far as color misregistration (positional deviation) arises. In the following descriptions, the scanner units 20a to 20d are provided as light irradiation units. Although an image forming apparatus having the intermediate transfer belt 30 has specifically been described above, the present invention can be diverted to image forming apparatuses of other types. The present invention can be diverted to, for example, an image forming apparatus having a recording material conveyance belt, in which toner images developed on the photosensitive drums 22 are directly transferred onto a transfer material (recording material) conveyed by the recording material conveyance belt (endless belt). In addition, the present invention can be diverted to a rotary system image forming apparatus in which the image is formed by sequentially move a plurality of developing unit rotationally held by one photosensitive drum to an image forming position.

Figure 2A:
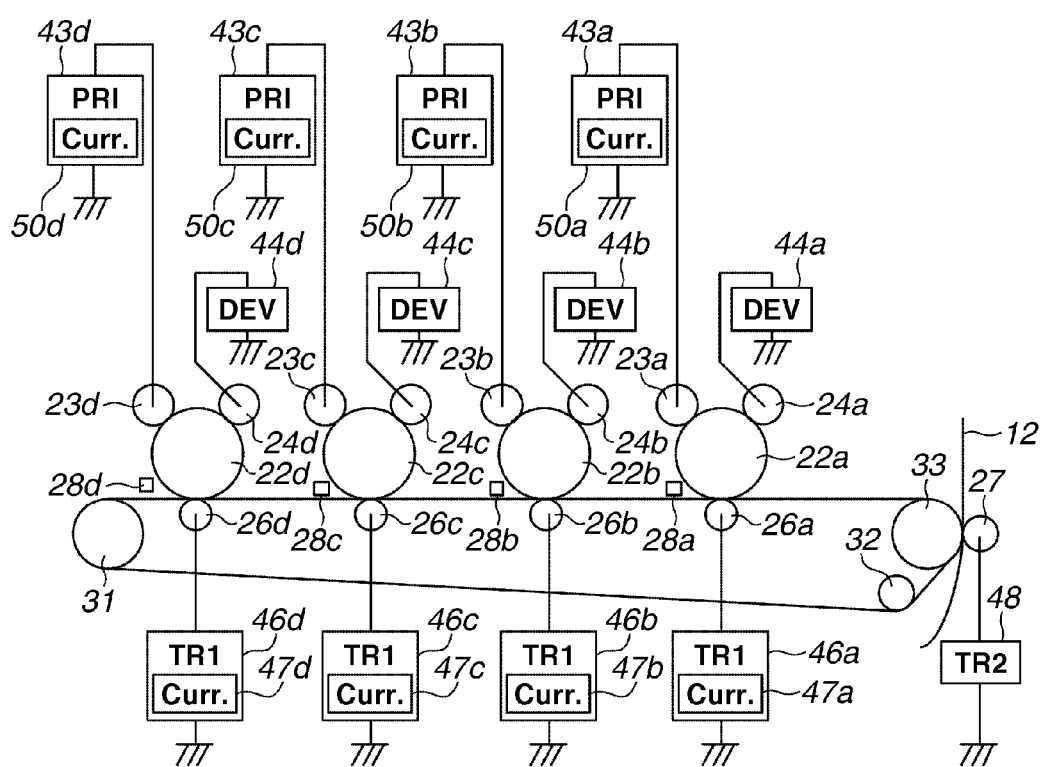
FIG. 2A illustrates a configuration of a high-voltage power supply device of the color image forming apparatus, having a plurality of high-voltage power supplies.

The configuration of the high-voltage power supply device in the image forming apparatus illustrated in FIG. 1 will be described below with reference to FIG. 2A. The high-voltage power supply device illustrated in FIG. 2A includes charging high-voltage power supply circuits 43a to 43d, development high-voltage power supply circuits 44a to 44d, primary transfer high-voltage power supply circuits 46a to 46d, and a secondary transfer high-voltage power supply circuit 48.

The charging high-voltage power supply circuits 43a to 43d apply a voltage to the charging rollers 23a to 23d, respectively, to form a background potential on the surfaces of the photosensitive drums 22a to 22d, respectively, enabling electrostatic latent images to be formed by laser beam irradiation. The charging high-voltage power supply circuits 43a to 43d include current detection circuits 50a to 50d, respectively.

The development high-voltage power supply circuits 44a to 44d apply a voltage to the developing sleeves 24a to 24d, respectively, to apply toner onto respective electrostatic latent images on the photosensitive drums 22a to 22d to form toner images. The primary transfer high-voltage power supply circuits 46a to 46d apply a voltage to the primary transfer rollers 26a to 26d, respectively, to transfer respective toner images from the photosensitive drums 22a to 22d onto the intermediate transfer belt 30. The secondary transfer high-voltage power supply circuit 48 applies a voltage to the secondary transfer roller 27 to transfer the toner image from the intermediate transfer belt 30 onto the recording medium 12.

Figure 2B:
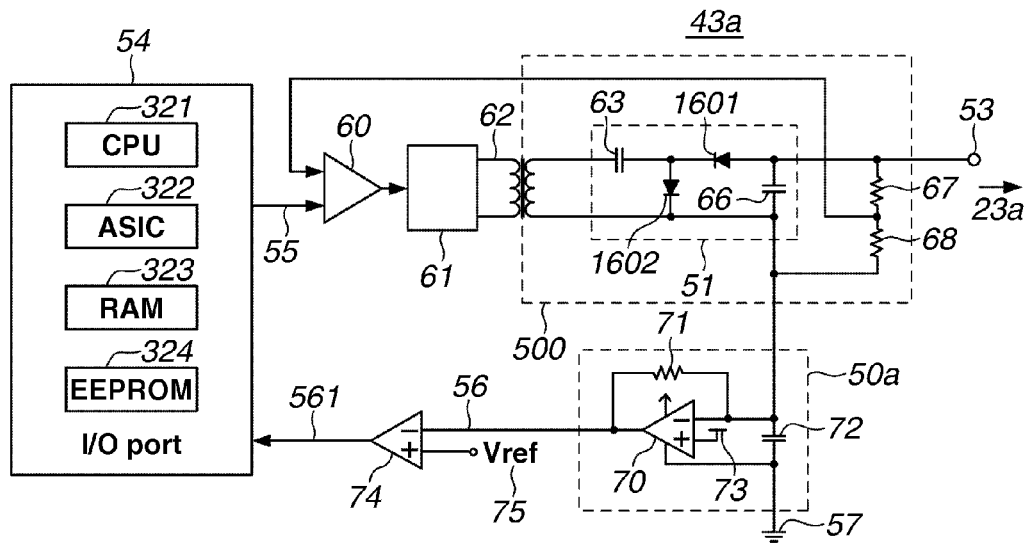
FIG. 2B is a circuit diagram illustrating a charging high-voltage power supply, a configuration of a control unit, and a hardware block diagram illustrating an engine control unit.

Circuit configurations of the charging high-voltage power supply circuit 43a in the high-voltage power supply device (see FIG. 2A) will be described below with reference to FIG. 2B. Referring to FIG. 2B, a transformer 62 boosts the voltage of an alternating current (AC) signal generated by a drive circuit 61 to several tens times amplitude. A rectifier circuit 51 including diodes 1601 and 1602 and capacitors 63 and 66 rectifies and smoothes the boosted AC signal. The rectified and smoothed voltage signal is output to an output terminal 53 as a negative direct current (DC) voltage. A comparator 60 controls the output voltage of the drive circuit 61 so that the voltage of the output terminal 53 divided by detection resistors 67 and 68 equals a voltage setting value 55 set by an engine control unit 54 (hereinafter simply referred to as control unit 54). According to the voltage of the output terminal 53, a current flows from the ground to the output terminal 53 via the photosensitive drums 22 and the charging rollers 23.

In this case, a current detection circuit 50a is inserted between a secondary side circuit 500 of the transformer 62 and a grounding point 57. The DC current output from the output terminal 53 flows through the secondary side circuit 500 of the transformer 62 toward the grounding point 57. However, since the input terminal of an operational amplifier 70 has high impedance and a current hardly flows, almost all of the DC current flows into a resistor 71. With the operational amplifier 70, since the inverting input terminal is connected (negatively fed back) to the output terminal 53 via the resistor 71, the inverting input terminal is imaginary grounded to a reference voltage 73 which is connected to the non-inverting input terminal. Therefore, a detection voltage 56 proportional to the amount of current flowing through the output terminal 53 appears at the output terminal of the operational amplifier 70. In other words, when the current flowing through the output terminal 53 changes, the current flowing through the resistor 71 changes with the detection voltage 56 of the output terminal of the operational amplifier 70, not the inverting input terminal of the operational amplifier 70, changing. A capacitor 72 is used to stabilize the inverting input terminal of the operational amplifier 70.

The detection voltage 56 indicating the amount of the detection current is input to the input terminal (inverting input terminal) of the negative electrode of the comparator 74. A threshold value Vref 75 is input to the positive electrode input terminal of the comparator 74. When the input voltage of the inverting input terminal falls below the threshold value Vref 75, the output is set to Hi (positive), and a binarization voltage value 561 (voltage set to Hi) is input to the control unit 54. The threshold value Vref 75 is set to a value between a local minimum value of a detection voltage 561 when an electrostatic latent image for color misregistration correction passes through the position facing the process unit and the value of the detection voltage 561 before it passes therethrough. Rising and falling edges of the detection voltage 561 are detected when the electrostatic latent image is detected once. The control unit 54 recognizes, for example, an intermediate point between the rising and falling edge detection timings of the detection voltage 561 as a detection point. The control unit 54 may detect either one of the rising and falling edges of the detection voltage 561.

The control unit 54 will be described below. The control unit 54 totally controls the operation of the image forming apparatus illustrated in FIG. 1. By using a random access memory (RAM) 323 as a main memory and a work area, a central processing unit (CPU) 321 controls the above-described engine mechanism unit according to various control programs stored in an electrically erasable programmable read-only memory (EEPROM) 324. Under instructions of the CPU 321, an application specific integrated circuit (ASIC) 322 controls, for example, each motor and developing bias high-voltage power supply in various print sequences. Apart or all of functions of the CPU 321 may be executed by the ASIC 322, and conversely a part or all of functions of the ASIC 322 may be executed by the CPU 321. Further, a part of functions of the control unit 54 may be executed by other hardware equivalent to the control unit 54.

Figure 2C:
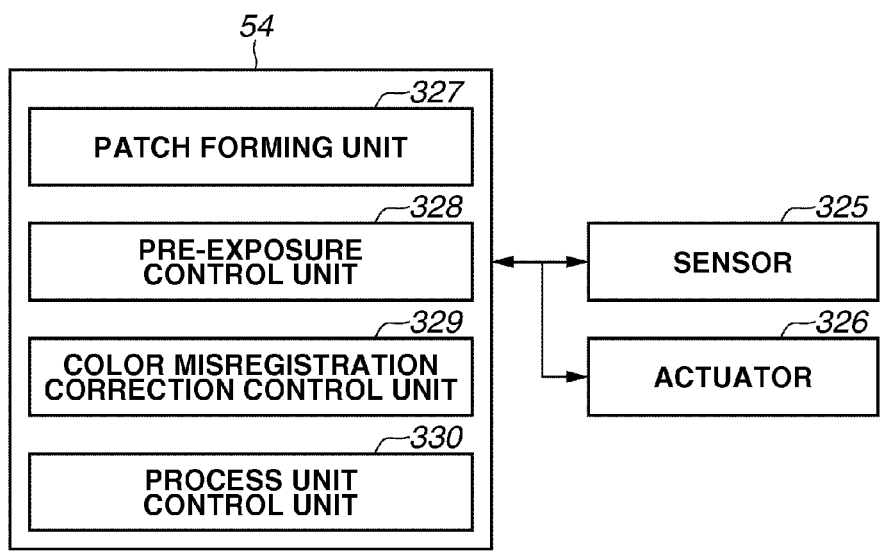
FIG. 2C is a function block diagram illustrating the engine control unit.

A function block diagram of the engine control unit 54 will be described below with reference to FIG. 2C. An actuator 326 and a sensor 325 are hardware components. A patch forming unit 327, a process unit control unit 330, a color misregistration correction control unit 329, and a pre-exposure control unit 328 are function blocks. Each unit will be described in detail below. Drive motors of drums, separation motors of the developing units, and other types of actuators are collectively referred to as the actuator 326. The resist sensor 111, current detecting circuits 50, and other types of sensors are collectively referred to as the sensor 325. The control unit 54 executes various processing based on information acquired from the sensor 325. The actuator 326 serves, for example, as a driving source for driving a cam for separating the developing sleeves 24a to 24d (described below) from the toner image forming position (developing position).

The patch forming unit 327 controls the scanner units 20a to 20d to form latent image marks (described below) on the photosensitive drums 22a to 22d, respectively. The process unit control unit 330 controls operations and settings of the process units at the time of electrostatic latent image detection (described below with reference to the timing chart in FIG. 3). Based on the timing detected on the detection voltage 561, the color misregistration correction control unit 329 calculates a color misregistration correction amount and reflects the calculated color misregistration correction amount by using a calculation method (described below). The pre-exposure control unit 328 controls the light amount of the pre-exposure LEDs 28a to 28d (ON/OFF control). Thus, latent image marks (described below) can be successfully detected by the current detecting circuits 50a to 50d.

The implementation of the above-described functions is not limited to a particular hardware configuration. The CPU 321, the ASIC 322, and other hardware components may operate in any way, and take partial charge of hardware processing in any way.

A method for controlling color misregistration correction according to the present exemplary embodiment will be described in detail below. With the above-described image forming apparatus, the method forms color misregistration detection marks by toner images onto the intermediate transfer belt 30 to at least reduce the color misregistration amount. After at least reducing the color misregistration state, the method measures time periods until an electrostatic latent image 80 reaches the positions of the charging rollers 23a to 23d by detecting a charging current change. Then, the method sets a reference value for color misregistration correction control based on the result of the measurement.

In color misregistration correction control performed when the internal temperature changes, for example, due to continuous printing, the method detects again a charging current change to measure time periods until the electrostatic latent image 80 reaches the positions of the charging rollers 23a to 23d. Variations in measured time periods reflect the color misregistration amount as it is. Therefore, the scanner unit 20a adjusts the light irradiation timing of the laser beam 21a so as to cancel the color misregistration amount at the time of printing, thus correcting color misregistration. Image forming condition control for color misregistration correction is not limited to the above-described light irradiation timing control, and may be based on, for example, photosensitive drum speed control and mechanical position adjustment for reflection mirrors included in each of the scanner units 20a to 20d.

Processing performed by the image forming apparatus having a charging high-voltage power supply circuit (described below) to form latent image marks will be described below with reference to FIG. 3. Then, processing for detecting the latent image marks by the charging high-voltage power supply circuit will be described below with reference to FIGS. 4A to 4J. The timing chart in FIG. 3 corresponds to each of the flowcharts in FIGS. 5A to 5C, 8A to 8C, and 9A and 9B (described below). Although FIG. 3 illustrates only control timing for yellow, similar processing is also performed for other colors. The photosensitive drums 22a to 22d for respective colors are rotatably driven, and the photosensitive drum surfaces are charged, for example, to −700 V with a charging high voltage.

At a timing T1, the control unit 54 outputs a driving signal for driving cams for separating the developing sleeves 24a to 24d from respective toner image forming positions (developing positions). The actuator 326 operates according to the output driving signal to drive the cams. At a timing T2, the developing sleeves 24a to 24d in contact with the photosensitive drums 22a to 22d, respectively, are separated therefrom. At a timing T3, the control unit 54 sets the primary transfer high voltage to OFF from ON.

At the timing T1, instead of separating the developing sleeves 24 from respective drums, the control unit 54 may zero the voltage output from the development high-voltage power supply circuits 44a to 44d, or apply an opposite-polarity voltage to the developing sleeves 24. The control unit 54 may set the operation of the development high-voltage power supply circuit so that the action of the developing sleeves 24a to 24d on the photosensitive members becomes smaller at least than the action at the time of regular toner image formation. Further, instead of turning OFF the primary transfer high voltage, the control unit 54 may separate the primary transfer rollers 26a to 26d from respective drums. Further, instead of turning OFF the primary transfer high voltage, the control unit 54 may set the operation of the primary transfer high-voltage power supply circuit so that the action of the primary transfer rollers 26a to 26d on the photosensitive members becomes smaller at least than the action at the time of regular toner image formation.

Figure 4A:
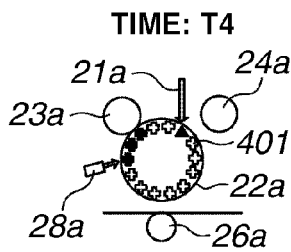
FIGS. 4A to 4J illustrate drum charging states at various timings in electrostatic latent image formation for color misregistration detection (color misregistration correction).
Figure 4B:
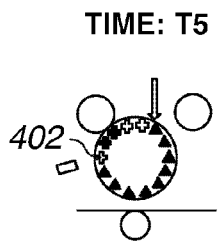

At a timing T4, the control unit 54 starts outputting laser signals. FIG. 4A illustrates a drum charging state at the timing T4. At the timing T4, laser signal emission needs to be performed in such a way that the photosensitive drum surface at a position facing the pre-exposure LED 28a has been pre-exposed and charged when the pre-exposure LED 28a is turned OFF at the subsequent timing T5 (see FIG. 4B). Therefore, before the timing T4, the pre-exposure and charging processing needs to be continued in advance at least for a predetermined time period. At a timing T8 (see FIG. 4E), the control unit 54 stops the formation (laser signal output) of electrostatic latent images 90.

At the timing T5 (see FIG. 4B) which is slightly earlier (for example, by 10 milliseconds) than a timing T6, the control unit 54 turns OFF the pre-exposure LED 28a. In this case, a photosensitive member surface position 401 (see FIG. 4A) is equivalent to a photosensitive member surface position 402 (see FIG. 4B). Leaving the photosensitive member surface position 402 in the post-charging state (white cross-shaped marks) increases the contrast between the electrostatic latent images 90 and the background, facilitating current change detection.

Turning OFF the pre-exposure LED 28a at the timing T5 enables the electrostatic latent images 90 to reach the charging roller 23a while maintaining the potential difference, although the electrostatic latent images 90 are regularly erased by the pre-exposure light irradiation before reaching the charging roller 23a. At the timing T5, the processing is not limited to turning OFF the pre-exposure LED 28a. At least reducing light emission amount than at the time of regular toner image formation enables obtaining a more favorable detection result for the electrostatic latent images 90 at least than a result that would be obtained otherwise.

Figure 4C:
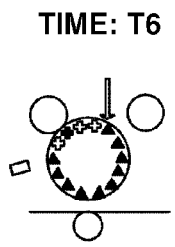
Figure 4D:
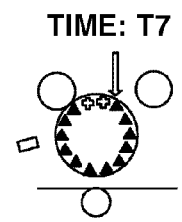
Figure 4E:
Figure 4F:
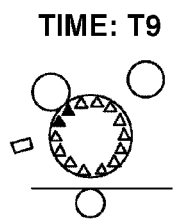
Figure 4G:
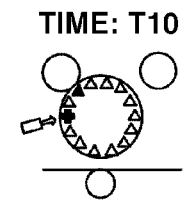
Figure 4H:
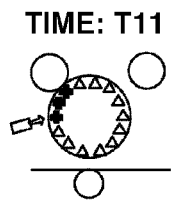
Figure 4I:
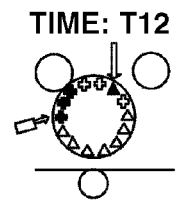
Figure 4J:
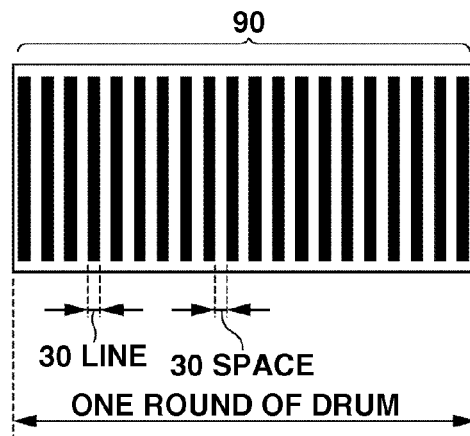

At the timing T6, since the photosensitive drum is rotatably driven, the formed electrostatic latent images 90 advance up to the position facing the pre-exposure LEDs 28a (see FIG. 4C). Then, the control unit 54 starts and intermittently continues outputting laser signals in a time period between the timings T4 and T8 to form a plurality of electrostatic latent images 90 on the photosensitive drum surface. When an electrostatic latent image is formed on the photosensitive drum surface, the drum surface potential is, for example, −100 V. In this case, the time period between the timings T4 and T8 is equivalent to the time period for one round of the drum. Although any number of the electrostatic latent images 90 may be formed, in this example, the control unit 54 repeats turning laser signal output ON and OFF for each 30 lines for one round of the drum to form 20 latent image marks at equal intervals for one round of the drum. FIG. 4J illustrates a planar development state of the drum surface on which 20 latent image marks are formed for one round of the drum.

The control unit 54 detects as a current change 91 in the current detection circuit 50a the electrostatic latent images 90 at the timings T7 (see FIG. 4D) to T11 when the electrostatic latent images 90 (formed at the timing T4) advance from the exposure position to the charging position. When the current change 91 is detected, the control unit 54 performs calculation processing (described below).

In this case, although the drum surface is charged again, for example, to −700 V simultaneously with current detection, there may be a case where the latent image portion cannot be sufficiently charged and is charged only to about −650 V. Therefore, to equalize the potential on the photosensitive drum surface, the control unit 54 turns ON the pre-exposure LED 28a again at a timing T10 (see FIG. 4G) which is slightly later than a timing T9 (see FIG. 4F) by 10 milliseconds, for example, when the trailing end of the electrostatic latent images 90 passes through the position facing the pre-exposure LED 28a. When the pre-exposure LED 28a is turned ON, the drum surface potential is set to −50 V and then uniformly charged to −700 V by the following charging roller 23a. Thus, when the photosensitive drum surface portion where the electrostatic latent images 90 (electrostatic latent image for color misregistration correction) are formed passes through the position facing the pre-exposure LED, the control unit 54 (pre-exposure control unit 328) controls the pre-exposure LED 28a to perform light re-emission.

At the timing T10, the control unit 54 waits for a predetermined time period. At a timing T12, when the pre-exposed and charged photosensitive drum surface position reaches the position of laser irradiation by the scanner unit 20a, the control unit 54 starts forming the following electrostatic latent image 92 again. In this case, the electrostatic latent images 90 are formed again when an additional time period (+x) has elapsed after the position facing the pre-exposure LED 28a moves to the exposure point. Above described processing aims for changing the state of a section between the pre-exposure point and the electrostatic latent images 90 to the pre-exposed post-charging state even if the pre-exposure LED 28a is turned OFF before the electrostatic latent images 90 reach the position facing the pre-exposure LED 28a.

After detecting all of the latent image marks formed on the drum surface by the current detection circuit 50a in this way, turning ON the pre-exposure LED 28a again enables equalizing the drum surface potential. After the drum surface having equal potential has been charged, the control unit 54 performs the following light irradiation via the scanner unit 20a, specifically, the formation of the electrostatic latent images 90 or regular image formation. In regular image formation, the control unit 54 applies the laser irradiation by the scanner unit based on, for example, image information input from an external device such as a host computer for forming images other than the electrostatic latent images 90. Although FIG. 4I illustrates a state where both the developing sleeve 24a and the primary transfer roller 26a are separated from the drum, in regular image formation, both of them may be brought into contact with the drum surface.

Processing for reference value acquisition in color misregistration correction control according to the present exemplary embodiment will be described below with reference to FIGS. 5A to 5C. Although FIG. 5A illustrates processing for yellow, similar processing is also performed for other colors. In step S301, the control unit 54 forms toner marks for color misregistration detection on the intermediate transfer belt 30 via the image forming unit. Since the toner marks for color misregistration detection are toner images used for color misregistration correction, they are also referred to as toner images for color misregistration correction. A state where the toner marks for color misregistration detection are formed is illustrated in FIG. 6A.

Figure 6A:
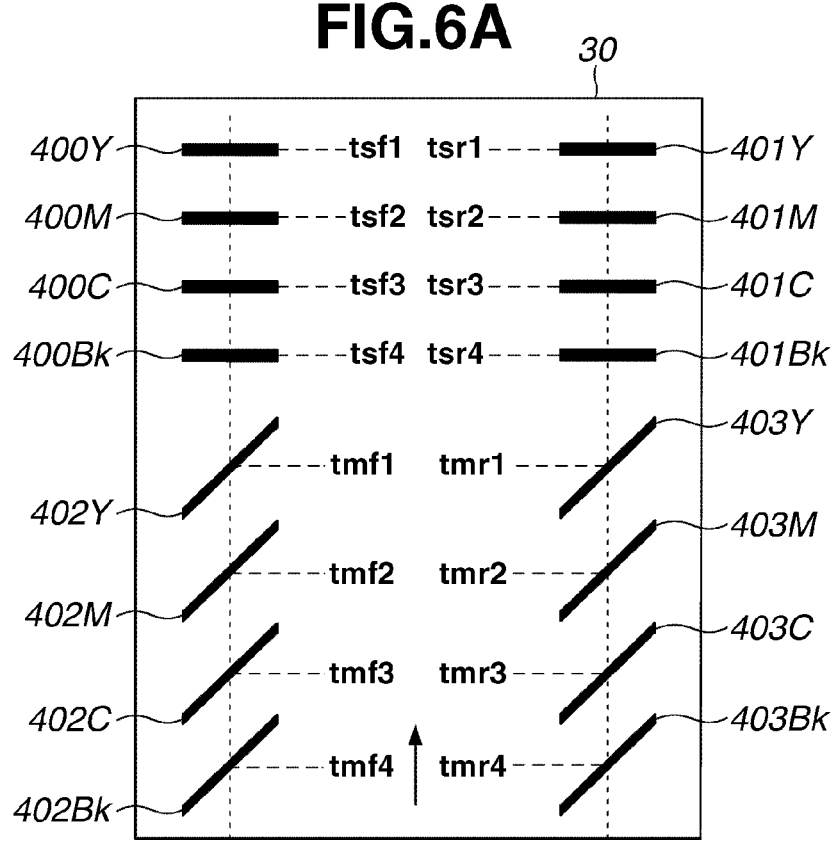
FIG. 6A illustrates example color misregistration detection marks (color misregistration correction) formed on an intermediate transfer belt.

Referring to FIG. 6A, toner marks (also referred to as toner patterns) 400 and 401 are used to detect the color misregistration amount in the sheet conveyance direction (sub scanning direction). Toner marks 402 and 403 are used to detect the color misregistration amount in the main scanning direction perpendicular to the sheet conveyance direction. In this example, the toner marks 402 and 403 are inclined by 45 degrees. Toner patterns are detected at detection timings tsf1 to tsf4, tmf1 to tmf4, tsr1 to tsr4, and tmr1 to tmr4. The arrow indicates the moving direction of the intermediate transfer belt 30. A known optical sensor can be applied to detect toner images for color misregistration correction. The optical sensor receives reflected light from the toner images irradiated with light and detects a voltage according to the received light amount.

Suppose, in terms of the sub scanning direction, a moving speed of v mm/s of the intermediate transfer belt 30, a reference color Y, and theoretical distances dsM, dsC, and dsBk between respective color patterns and the Y pattern for the patterns 400 and 401 in the sheet conveyance direction. For example, with the reference color Y, the color misregistration amount of the color M (magenta), δesM, is represented by the following equation 1. δesC and δesBk are represented in a similar way, and duplicated descriptions will be omitted. dsM indicates an ideal distance between the Y and M patterns.

$$\delta esM = v \times \{(tsf2-tsf1)+(tsr2-tsr1)\}/2 - dsM \qquad \text{Equation 1}$$

Suppose, in terms of the main scanning direction, color misregistration amounts for respective colors on the left and right sides, δemf and δemr, respectively. For example, with the reference color Y, a color misregistration amount δemf for the color M, δemfM, is represented by the following equation 2. δemfC, δemfBk, δemrM, δemrC, and δemrBk are represented in a similar way, and duplicated descriptions will be omitted.

$$\delta emfM = v \times (tmf2-tsf2) - v \times (tmf1-tsf1) \qquad \text{Equation 2}$$

The color misregistration direction can be determined based on the sign (positive or negative) of the calculation result. A writing position is corrected based on δemf, and the main scanning width (main scanning magnification) is corrected based on δemr−δemf. If the main scanning width (main scanning magnification) has an error, the writing position is calculated in consideration of not only δemf but also an amount of image frequency (image clock) change according to main scanning width correction.

Then, the control unit 54 changes the laser beam emission timing by the scanner unit 20a, as an image forming condition, to cancel the calculated color misregistration amount. For example, when the color misregistration amount in the sub scanning direction is −4 lines, the control unit 54 instructs a video controller 200 to bring forward the laser beam emission timing by +4 lines.

Thus, the processing in step S301 enables performing control with subsequent electrostatic latent images for color misregistration correction based on a state where the color misregistration amount is at least reduced.

The flowcharts in FIGS. 5A to 5C will be described below. In step S302, to restrain the effect of variation in the rotational speed (circumferential speed) of the photosensitive drums 22a to 22d, the control unit 54 adjusts the rotational phase relation (rotational position relation) between the photosensitive drums 22a to 22d to a predetermined state. Specifically, under control of the control unit 54, the phases of the photosensitive drums for other colors are adjusted with respect to the phase of the photosensitive drum for the reference color. When the rotating shafts of the photosensitive drums are provided with a photosensitive drum drive gear, the control unit 54 virtually adjusts the phase relation between each of the drive gears of respective photosensitive drums. Before starting the processing in step S305, the control unit 54 waits until the rotational phase difference between each of the photosensitive drums becomes a predetermined phase difference. In this predetermined phase difference state, the rotational phase of each photosensitive member has a fixed phase difference (including zero) with respect to the rotational phases of other photosensitive members.

In step S303, the control unit 54 starts a timer. In steps S304 to S307, the control unit 54 performs loop processing with i=1 to 20. In step S305 in the loop processing, the control unit 54 sequentially outputs laser signals. The scanner unit 20a performs light irradiation according to the output electrostatic latent image signal. In step S306, the control unit 54 waits for a predetermined time period. Above described processing aims for avoiding overlapped detection results of electrostatic latent images formed for respective colors. The wait time is set so that electrostatic latent images are not overlapped with each other even if the maximum possible color misregistration for the image forming apparatus arises. The wait time is desirably shorter than the time of one rotation of the photosensitive drum 22a.

In this case, the developing sleeve 24a and the primary transfer roller 26a arranged on the upstream side of the charging roller 23a, where an electrostatic latent image is detected, are separated from the photosensitive drum 22a. Alternatively, the applied voltage is set to OFF (zero) so that the action on the photosensitive drum 22a becomes at least smaller than the action at the time of regular toner image formation. It is also possible that the developing bias high-voltage power supply circuits (development high-voltage power supply circuits 44a to 44d) apply a bias voltage having a polarity opposite to normal to the developing sleeves 24 to prevent toner adhesion to electrostatic latent images. When the jumping development process is employed, in which the photosensitive drum 22a to 22d and the developing sleeve 24a to 24d are not in contact with each other, respectively, and a voltage including a DC bias and an AC bias superimposed thereon is applied to the developing sleeves 24, it is only necessary to turn OFF voltage application thereto. Then, the application of the separation state or applied-voltage OFF state is continued until the processing in the flowcharts in FIGS. 5A to 5C is completed. This also applies to the flowcharts in FIGS. 8A to 8C, 12A to 12C, and 13A to 13C (described below).

Figure 6B:
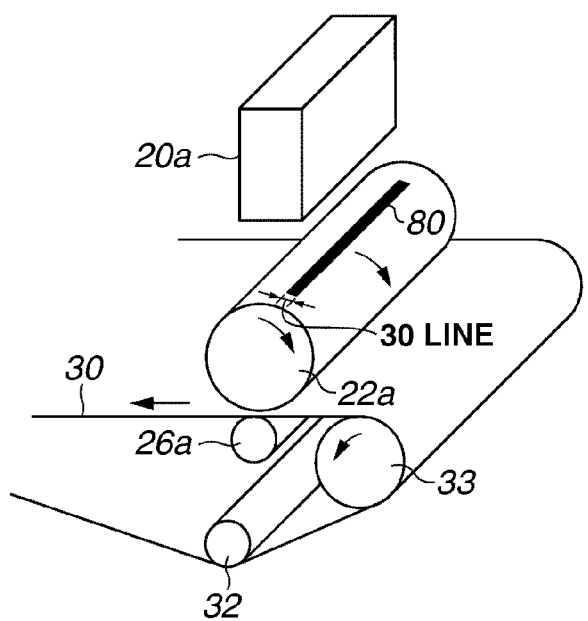
FIG. 6B illustrates an electrostatic latent image for color misregistration detection (color misregistration correction) formed on a photosensitive drum.

FIG. 6B illustrate an electrostatic latent image 80 formed on the photosensitive drum 22a for yellow. The electrostatic latent image 80 is also referred to as electrostatic latent image for positional deviation correction. The electrostatic latent image 80 is drawn as large as possible within the image region width in the scanning direction, and has a size of about 30 lines in the conveyance direction. The width of the electrostatic latent image 80 in the main scanning direction is desirably at least a half of the maximum value to obtain a favorable detection result. It is further useful to expand the width of the electrostatic latent image 80, exceeding the paper region outside the image region (print image region on paper), up to a region in which electrostatic latent image formation is possible.

The flowchart in FIG. 5B will be described below. Although FIG. 5B illustrates processing for yellow, similar processing is also performed for other colors. In steps S311 to S314, the control units 54 executes loop processing with i=1 to 40. In step S312, the control unit 54 detects an edge detection timing ty (i) (i=1 to 40) with respect to the reference timing for 20 electrostatic latent images formed by the processing of the flowchart in FIG. 5A. The control unit 54 recognizes edge detection at the time the output of the binarization voltage value 561 has changed, and the processing proceeds to step S313.

In step S313, the control unit 54 temporarily stores a detected timer value ty(i) in the RAM 323. Specifically, the control unit 54 stores a plurality of detection results which is used as a measurement result (first measurement result) in which at least the rotation period component of the photosensitive drum 22a is reduced.

Figure 7A:
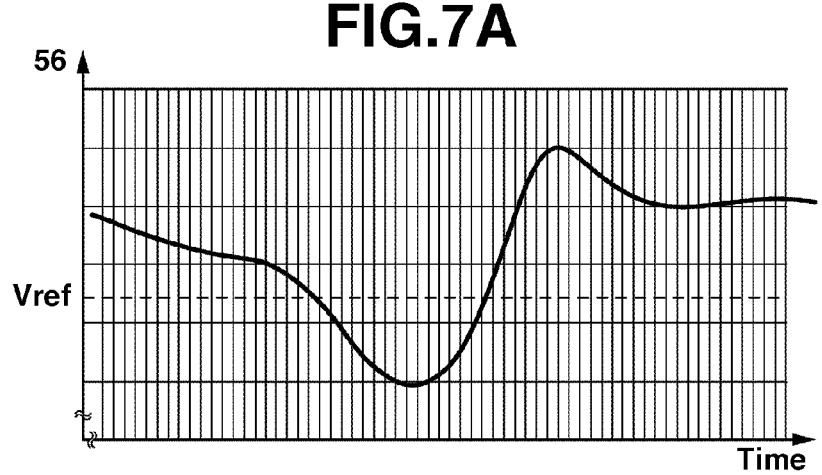
FIG. 7A illustrates an example result of photosensitive drum surface potential information detection, FIG. 7B schematically illustrates a photosensitive drum surface potential with no toner adhering to an electrostatic latent image, and FIG. 7C schematically illustrates a photosensitive drum surface potential with toner adhering to the electrostatic latent image.

FIG. 7A illustrates an output value related to the surface potential of the photosensitive member (photosensitive drum 22a) output by the current detection circuit 50a when the electrostatic latent image 80 reaches the charging roller 23a serving as a process unit. Referring to FIG. 7A, the vertical axis is assigned to a detected voltage indicating a current change and the horizontal axis is assigned to time. The waveform illustrated in FIG. 7A indicates that, the voltage decreases to a local minimum value when the electrostatic latent image 80 reaches the charging roller 23a, and then increases.

Figure 7B:
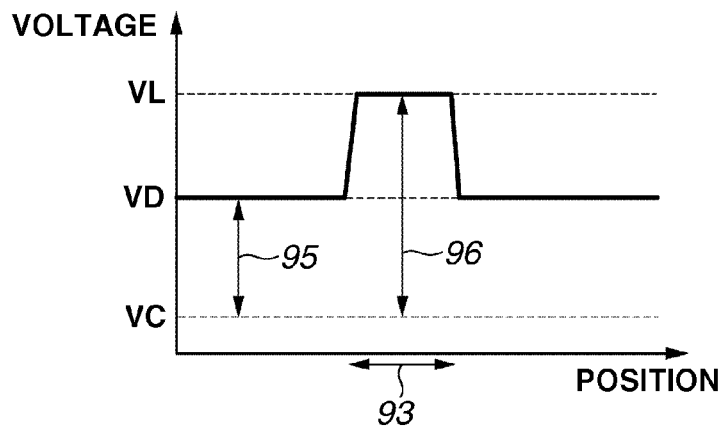
Figure 7C:
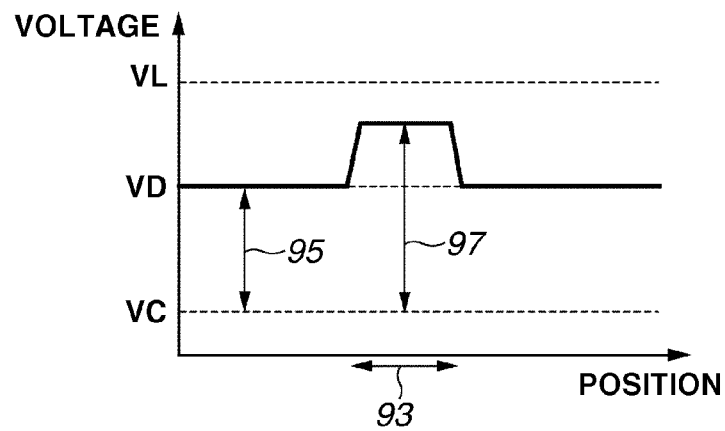

A reason why the detected voltage decreases will be described below. FIGS. 7B and 7C schematically illustrate the surface potential of the photosensitive drum 22a in a case where no toner adheres to the electrostatic latent image 80 and in a case where toner adheres thereto, respectively. The horizontal axis indicates the surface position of the photosensitive drum 22a in the conveyance direction, and a region 93 indicates a position where the electrostatic latent image 80 is formed. The vertical axis indicates the potential of the photosensitive drum 22a. The photosensitive drum 22a has a dark potential VD (for example, −700 V) and a light potential VL (for example, −100 V). The charging roller 23a has a charging bias potential VC (for example, −1000 V).

In the region 93 of the electrostatic latent image 80, a potential difference 96 between the charging roller 23a and the photosensitive drum 22a is larger than a potential difference 95 in other regions. For this reason, when the electrostatic latent image 80 reaches the charging roller 23a, the current value flowing through the charging roller 23a increases. With this current increase, the voltage value of the output terminal of the operational amplifier 70 drops. The detected voltage value decreases for this reason. The current value detected in this way reflects the surface potential of the photosensitive drum 22a.

With the above-described configuration, in color misregistration detection in the flowcharts in FIGS. 6A and 6B, the developing sleeve 24a is separated from the photosensitive drum 22a, and color misregistration is detected without applying toner to the electrostatic latent image 80. However, the configuration is not limited thereto. Color misregistration can be detected even when toner is applied to the electrostatic latent image 80.

FIG. 7C schematically illustrates a potential difference 97 between the photosensitive drum 22a and the charging roller 23a when toner is applied onto the electrostatic latent image 80. Elements equivalent to those in FIG. 7B are assigned with the same reference numerals, and duplicated descriptions will be omitted. In the region 93 of the electrostatic latent image 80, the potential difference 97 between the charging roller 23a and the photosensitive drum 22a when toner is applied to the electrostatic latent image 80 is smaller than the potential difference 96 therebetween when toner is not applied thereto. Therefore, although the difference between the potential differences 95 (in other regions) and the potential difference 97 is small, a current change can be sufficiently detected. In this case, it becomes necessary to clean the toner on the photosensitive drum 22a and the intermediate transfer belt 30 after color misregistration detection. However, unless the density is high, simple cleaning suffices and causes no virtual problem. At least, in comparison with a case where 100%-density toner images for detection (in color misregistration correction control) are transferred onto the intermediate transfer belt 30, etc. and the belt is cleaned, cleaning can be done in a short time.

In step S321, the control unit 54 performs the following logic operations. The following operations obtain a difference between edge intermediate points of electrostatic latent images of two colors. The CPU 321 may perform the operations based on a program code or a hardware circuit or table may perform the operations. The calculation method is not limited to a particular method.

$$\delta esYM = \Sigma\{k=1 \text{ to } 20\} \{(tm(2k-1)+tm(2k))/2\} - \Sigma\{k=1 \text{ to } 20\} \{(ty(2k-1)+ty(2k))/2\} \quad \text{Equation 3}$$

$$\delta esYC = \Sigma\{k=1 \text{ to } 20\} \{(tc(2k-1)+tc(2k))/2\} - \Sigma\{k=1 \text{ to } 20\} \{(ty(2k-1)+ty(2k))/2\} \quad \text{Equation 4}$$

$$\delta esYBk = \Sigma\{k=1 \text{ to } 20\} \{(tbk(2k-1)+tbk(2k))/2\} - \Sigma\{k=1 \text{ to } 20\} \{(ty(2k-1)+ty(2k))/2\} \quad \text{Equation 5}$$

More specifically, in step S321, the control unit 54 performs the operations of the amount of sub scanning color misregistration, $\delta esYM$, for each color with respect to the reference (yellow) based on measurement values $ty(1)$ to $ty(40)$ and $tm(1)$ to $tm(40)$, based on the above-described equations 3 to 5. The control unit 54 calculates $\delta esYC$ and $\delta esYBk$ in a similar way.

The control unit 54 stores $\delta esYM$, $\delta esYC$, and $\delta esYBk$ (obtained by the operation in step S321) in an EEPROM 324 as data indicating the color misregistration amount in which the rotation period component of respective photosensitive drums is canceled.

The storage information indicates a target reference state at the time of color misregistration correction control. The control unit 54 performs color misregistration correction control so as to cancel the color misregistration from the reference state, in other words, to return to the reference state.

Figure 8A:
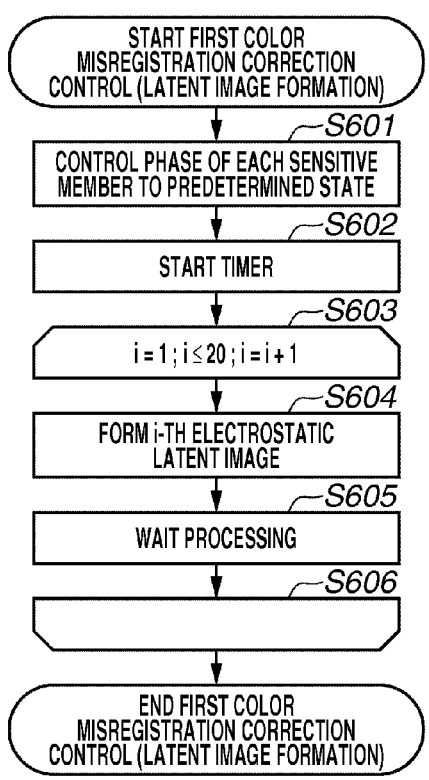
FIGS. 8A to 8C are flowcharts illustrating processing for color misregistration correction control.
Figure 8B:
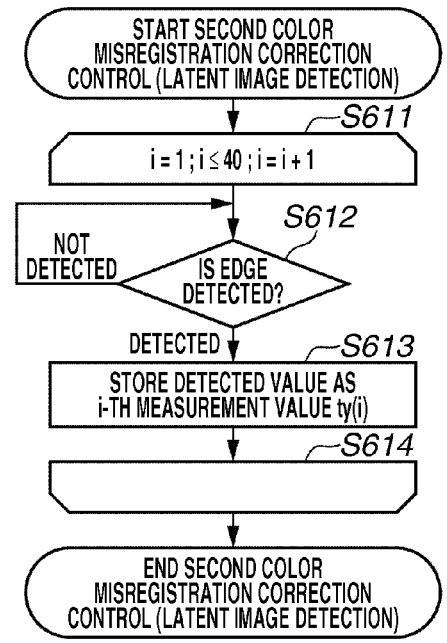

The flowcharts for color misregistration correction control illustrated in FIGS. 8A to 8C will be described below. The processing in each step of the flowchart in FIG. 8A is similar to the processing in steps S302 to S307 in FIG. 3, and the steps S611 to S614 in FIG. 8B are similar to the steps S311 to S314 in FIG. 5B, and duplicated descriptions will be omitted. The flowcharts in FIGS. 8A to 8C will be described below centering on differences from the flowcharts in FIGS. 5A to 5C.

In step S621, the control unit 54 performs operations of d$\delta esYM$, d$\delta esYC$, and d$\delta esYBk$ based on the measurement result stored in step S613 in FIG. 8B. The leading character "d" means that the value is an actually detected value. Detailed calculations are virtually as described above with reference to equations 3 to 5. In step S622, the control unit 54 once stores the result of calculations (second measurement result) in the RAM 323.

In step S623, the control unit 54 obtains a difference between d$\delta esYM$ calculated instep S621 and $\delta esYM$ stored instep S322 in FIG. 5A to 5C. When the difference is equal to or larger than 0 ($\geq 0$ in step S623), i.e., the detection timing for magenta is later than that for the reference (yellow), the processing proceeds to step S624. In step S624, the control unit 54 brings forward the laser beam emission timing for magenta by the difference value. Otherwise, when the difference is less than 0 (<0 in step S623), i.e., the detection timing for magenta is earlier than the reference (yellow), the processing proceeds to step S625. In step S625, the control unit 54 delays the laser beam emission timing for magenta by the difference value. Thus, color misregistration amount between yellow and magenta can be suppressed.

In steps S626 to S631, similar to the case of magenta, the control unit 54 also corrects the laser beam emission timing (image forming condition) for cyan and black. Thus, the processing in the flowcharts in FIGS. 8A to 8C enables returning the current color misregistration state to the reference color misregistration state (reference state).

In the present exemplary embodiment, the control unit 54 forms the electrostatic latent image 80 with a plurality of photosensitive drum phases, and stores a reference value in step S322. With the reference value, based on the result of detection, the rotation period component of the photosensitive drum is canceled in advance. Subsequently, in the processing in the flowcharts in FIGS. 8A to 8C, the control unit 54 forms the electrostatic latent image 80 again with a plurality of photosensitive drum phases, acquires the measurement result with the rotation period component of the photosensitive drum (acquired from the detection result) canceled, and compares the reference value with the reference value previously calculated and stored. However, for example, other operation methods not performing comparison with a previously acquired reference value as an average may be assumed. For example, the control unit 54 may store the data acquired in step S313 (see FIG. 5A) and step S613 (see FIG. 8A) and, by using the plurality of stored data, finally perform operation of data equivalent to the color misregistration amount with the rotation period component of the photosensitive drum canceled.

Figure 8C:
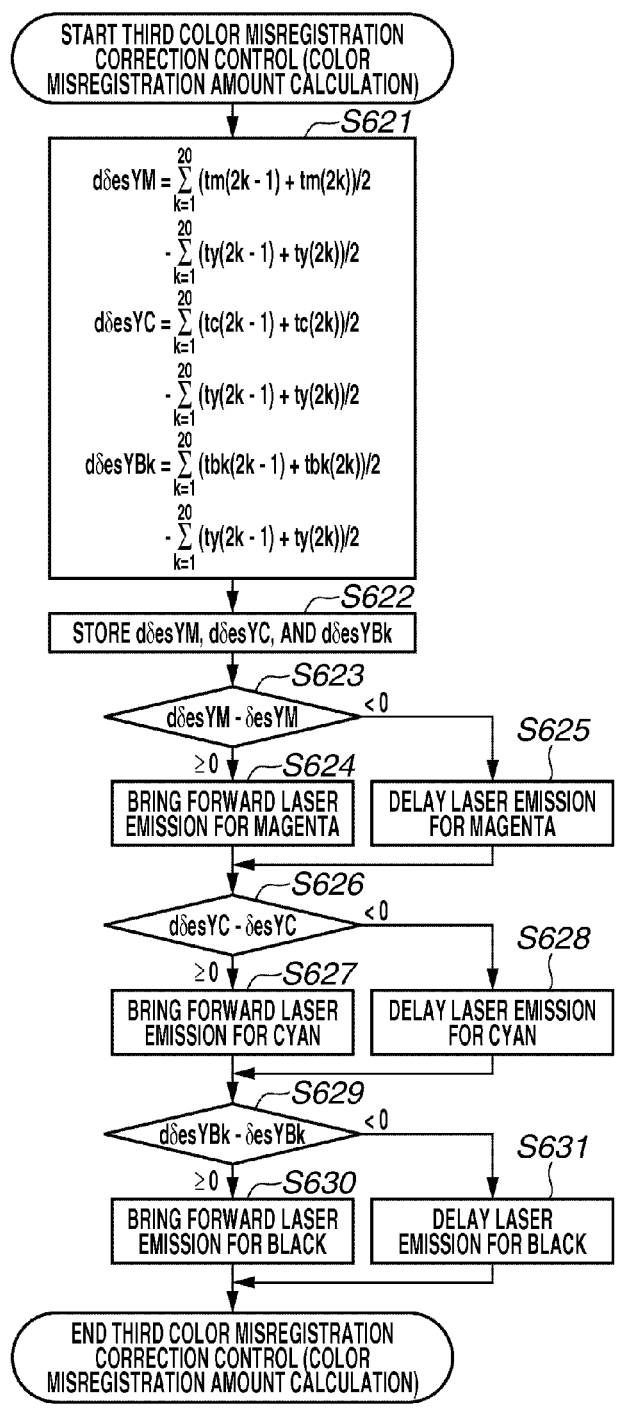
Figure 9A:
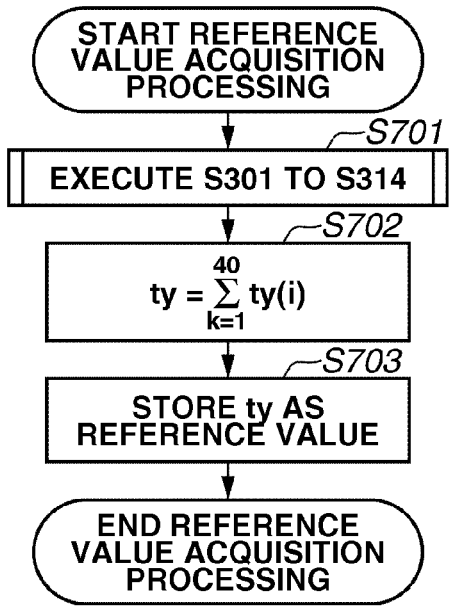
FIG. 9A is a flowchart illustrating processing for another reference value acquisition.
Figure 9B:
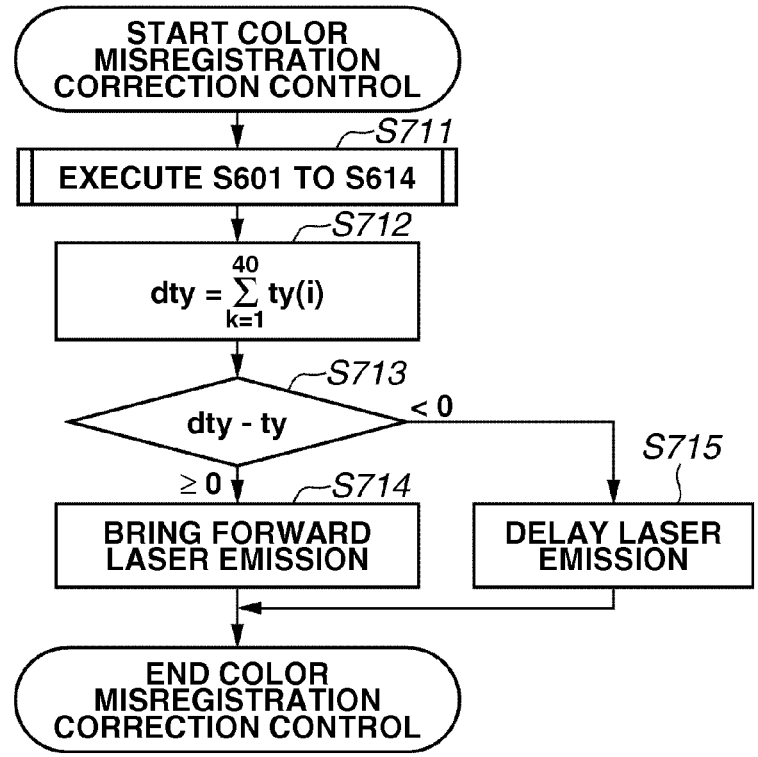
FIG. 9B is a flowchart illustrating processing for another color misregistration correction control.

Although, in the flowchart in FIGS. 5A to 5C and 8A to 8C, relative color misregistration between two colors (i.e., the reference color and the measurement color) is corrected, a method of color misregistration detection as illustrated in FIGS. 9A and 9B is also assumed.

The processing in FIG. 9A is a modification of the processing in FIGS. 5A to 5C. Processing similar to that in FIGS. 5A to 5C is assigned with the same reference numerals, and duplicated descriptions will be omitted. Although FIG. 9A illustrates only the processing for yellow, similar processing is also performed for other colors. This also applies to FIG. 9B described below. In step S701, the control unit 54 performs operation of summation ty of $ty(1)$ to $ty(40)$ stored in step S313. In other words, the control unit 54 virtually performs operation of an average with the rotation period component of the photosensitive drum canceled. In step S702, the control unit 54 stores the result of the operation as the reference values ty.

The processing in FIG. 9B is a modification of the processing in FIGS. 8A to 8C. Processing similar to that in FIGS. 8A to 8C is assigned with the same reference numerals, and duplicated descriptions will be omitted. In step S712, the control unit 54 performs operation of summation dty of $ty(1)$ to $ty(40)$. In step S713, the control unit 54 calculates (dty-ty). Above described operation enables detecting a change from the reference state. When (dty-ty) is equal to or larger than 0 ($\geq 0$ in step S713), the processing proceeds to step S714. In step S714, the control unit 54 brings forward the laser beam emission timing depending on the value of (dty-ty). Otherwise, when (dty-ty) is less than 0 (<0 instep S713), the processing proceeds to step S715. In step S715, the control unit 54 delays the laser beam emission timing depending on the value of (dty-ty). Thus, the color misregistration amount can be returned to the reference state.

In the above-described charging high-voltage power supply circuit, the current detection circuit 43 is provided to each of the charging rollers 23a to 23d. However, the configuration is not limited thereto. A common current detection circuit may be provided to the charging rollers 23a to 23d for respective colors.

A second exemplary embodiment will be described below. For processing equivalent to that in the first exemplary embodiment, duplicated descriptions will be omitted.

Figure 10:
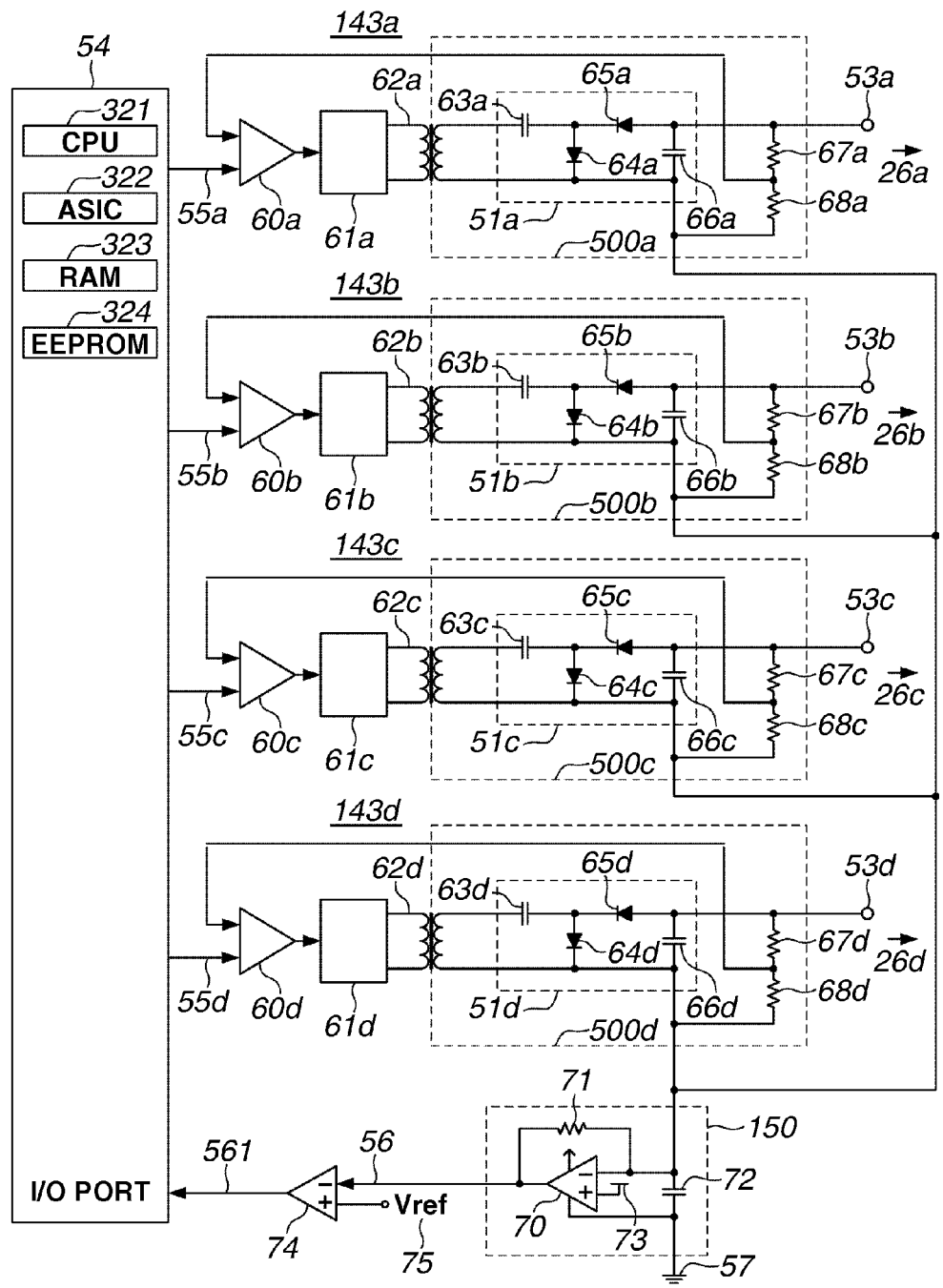
FIG. 10 is a circuit diagram illustrating a charging high-voltage power supply having a common ammeter.

Circuit configurations of the charging high-voltage power supply circuits 143a to 143d and the current detection circuit 150 will be described below with reference to FIG. 10. Configurations equivalent to those in FIG. 2B are assigned with the same reference numerals, and duplicated descriptions will be omitted. Referring to FIG. 10, based on setting values 55a to 55d to be set to the comparators 60a to 60d, respectively, the control unit 54 controls the drive circuits 61a to 61d to output desired voltages to the outputs 53a to 53d, respectively. The circuit configurations illustrated in FIG. 10 are similar to those illustrated in FIG. 2B in that the currents output from the charging high-voltage power supply circuits 143a to 143d flow through the photosensitive drums 22a to 22d, the charging rollers 23a to 23d, and the grounding point 57, respectively, and then flow into the current detection circuit 150. The value of the detection voltage 56 corresponds to a current value produced by superimposing the currents of the output terminals 53a to 53d.

Similar to the circuit configurations in FIG. 2B, also in the circuit configurations in FIG. 10, the inverting input terminal of the operational amplifier 70 is imaginary grounded to the reference voltage 73, provided with a fixed voltage. Therefore, there is almost no case where the voltage of the inverting input terminal of the operational amplifier 70 fluctuates by the operations of the charging high-voltage power supply circuits for other colors, and fluctuations affect the operations of the high-voltage power supply circuit for another color. In other words, the plurality of charging high-voltage power supply circuits 143a to 143d is not affected with each other, and perform similar operation to the charging high-voltage power supply circuits 43a in FIG. 2B.

Color misregistration correction control by the image forming apparatus including the charging high-voltage power supply circuits illustrated in FIG. 10 will be described below with reference to the timing chart illustrated in FIG. 11. The timing chart illustrated in FIG. 11 corresponds to the respective flowcharts in FIGS. 12A to 12C, 13A to 13C, and 14A to 14C (described below). Description will be made centering on differences from the timing chart in FIG. 3.

At timings T1 to T3, the control unit 54 changes the state of each process unit to a state where electrostatic latent images can be formed and detected. This point is similar to that in FIG. 3.

Figure 11:
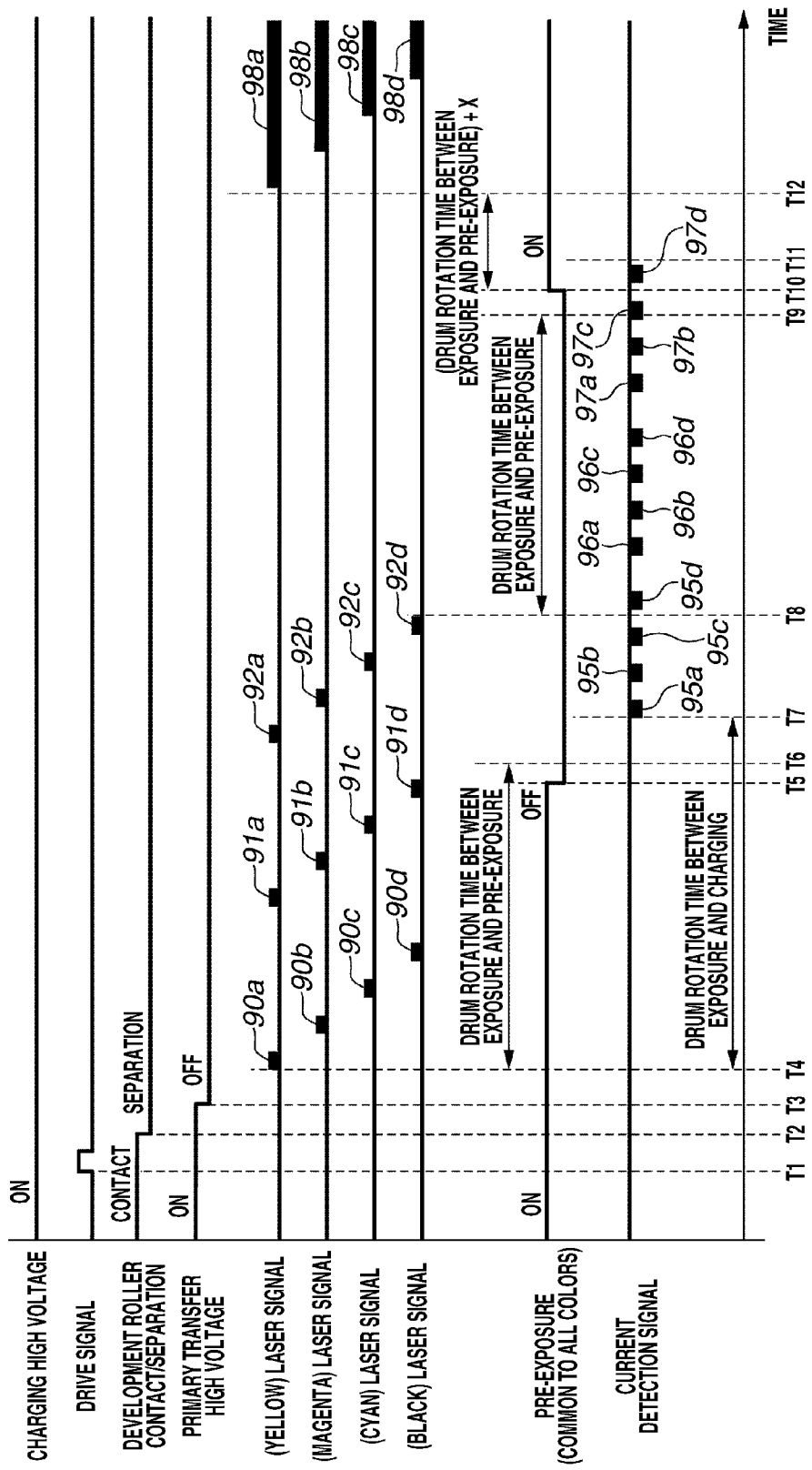
FIG. 11 is a timing chart related to electrostatic latent image formation for color misregistration detection in an image forming apparatus having a common ammeter.

At time period of timings T4 to T8 illustrated in FIG. 11, electrostatic latent images for color misregistration correction are formed at cycles of about ⅓ of each of the photosensitive drums 22a to 22d for respective colors. Referring to FIG. 11, electrostatic latent images are formed by laser signals 90a, 90b, 90c, 90d, 91a, 91b, 91c, 91d, 92a, 92b, 92c, and 92d in this order. In this case, as described above with the current detection circuit 150 in FIG. 10, the detected current value is a current value produced by superimposing the currents flowing through the charging rollers 23a to 23d. Further, none of current detecting signals 95a to 95d, 96a to 96d, and 97a to 97d illustrated in the FIG. 11 overlaps since electrostatic latent images are formed in such a way. The current detecting signals are corresponding to the above-described detection voltages 56 and 561. To prevent the contrast between the electrostatic latent images 90 and the background from decreasing by pre-exposure at the timings T4 to T8 illustrated in FIG. 11, at the timing T5, the control unit 54 turns OFF the pre-exposure LEDs 28a to 28d. The timing T5 is earlier than the timing when the latent image mark 90a formed first passes through the position facing the pre-exposure LED 28a. When a common ammeter is used as in the present exemplary embodiment, if any one of the pre-exposure LED 28a to 28d is turned ON, a current flows to charge the drum surface potential by the charging rollers. As a result, the relevant waveform is output to the current detecting signals. Therefore, at the timing T5, the pre-exposure LED 28a to 28d for all colors need to be turned OFF.

During a time period between the timings T7 and T11 illustrated in FIG. 11, the current detecting signals 95a to 95d indicate changes in the detected current, i.e., the result of current change detection by the electrostatic latent images formed by the laser signals 90a to 90d, respectively. Likewise, the current detecting signals 96a to 96d indicate the result of current change detection by the laser signals 91a to 91d, respectively. the current detecting signals 97a to 97d indicate the result of current change detection by the laser signals 92a to 92d, respectively. Since none of detection timings overlaps with each other, the common current detection circuit can be applied to a plurality of process units (charging rollers) of detection targets.

Processing after the timing T10 illustrated in FIG. 11 will be described below. At the timing 10 after the timing T9 when an electrostatic latent image 92d last formed passes through a position facing the pre-exposure LEDd, the control unit 54 turns ON the pre-exposure LED 28a to 28d to start the processing for equalizing the drum surface potential to prepare for subsequent image formation processing. When a common ammeter is used, turning ON at least one pre-exposure LED affects the current detection signals similar to a case when the pre-exposure LED is turned OFF. Therefore, it is necessary to adjust the timing for turning ON the pre-exposure LEDs for respective colors with the current detection end timing for the color whose latent image mark is lastly formed.

At the timing T12, the control unit 54 restarts outputting laser signals. The restart condition is as described with reference to FIG. 3.

Operations of the color misregistration amount in the timing chart illustrated in FIG. 11 will be described below with reference to the flowcharts in FIGS. 12A to 12C, 13A to 13C, and 14A and 14B only on differences from the flowcharts in FIGS. 5A to 5C, 8A to 8C, and 9A and 9B.

Figure 12A:
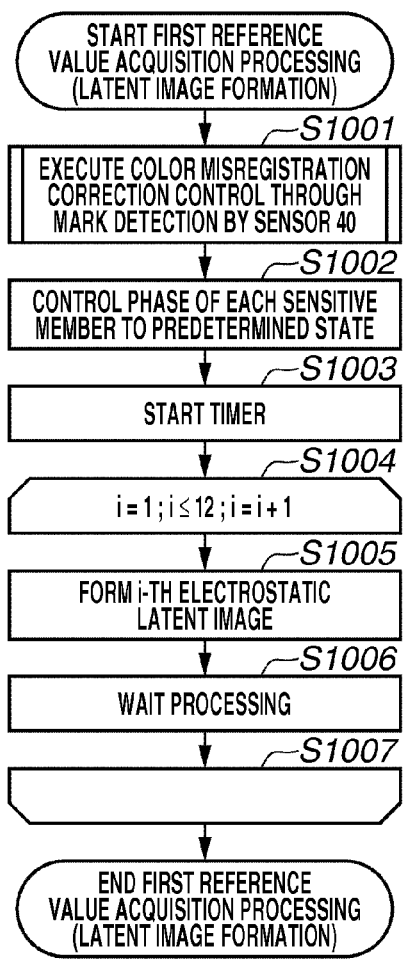
FIGS. 12A to 12C are flowcharts illustrating processing for reference value acquisition in the image forming apparatus having a common ammeter.
Figure 12B:
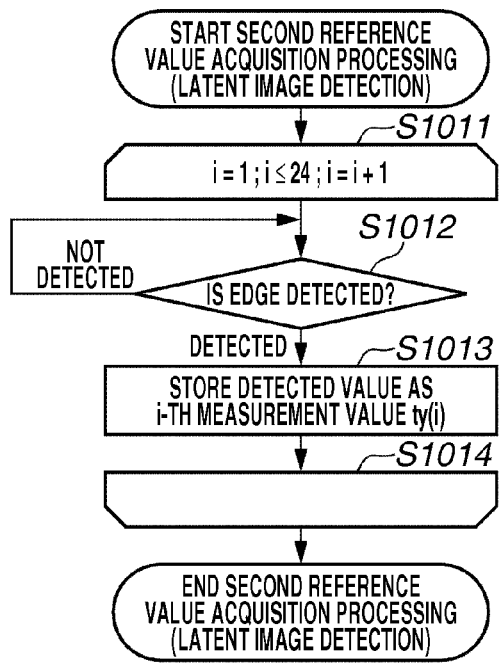
Figure 12C:
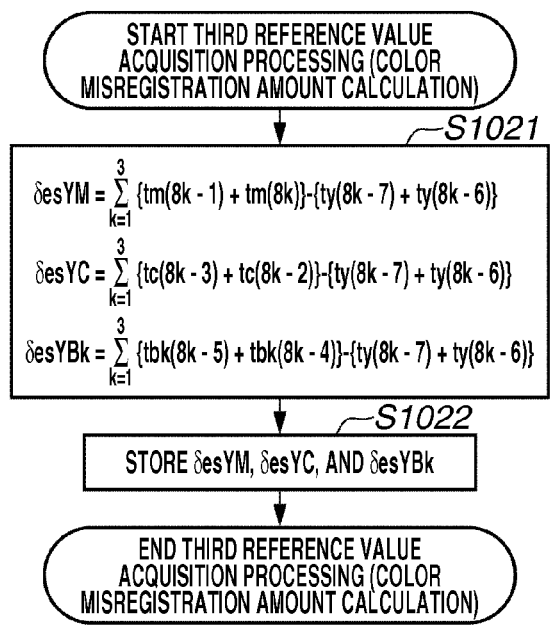

In steps S1004 to S1007 in FIGS. 12A to 12C, the control unit 54 performs loop processing with i=1 to 12. During a time period between the timings T4 and T6 illustrated in FIG. 11, electrostatic latent images for color misregistration correction can be formed on the photosensitive drums for respective colors at about ⅓ cycles of each photosensitive drum. In steps S1011 to S1014, the control unit 54 detects 24 edges corresponding to the loop processing for i=1 to 12. In step S1021, the control unit 54 obtains a difference between the sum of edge detection timings of the start and end of measurement-color electrostatic latent image detection and the sum of edge detection timings of the start and end of reference-color electrostatic latent image detection to obtain a relative misregistration between the two colors. Like the case where the control unit 54 performs in the flowcharts in FIGS. 8A to 8C similar processing to the flowcharts in FIG. 5A to 5C, it performs in the flowcharts in FIGS. 13A to 13C similar processing to the flowcharts in FIGS. 12A to 12C.

On the other hand, the flowcharts in FIG. 14A and 14B are modifications of the flowcharts in FIG. 9A and 9B, respectively. Instead of steps S702 and S712, the control unit 54 performs processing in steps S1202 and S1212 in FIGS. 14A and 14B, respectively. In this case, however, the control unit 54 performs operation of edge detection summation of electrostatic latent images for respective colors formed for one round of the photosensitive drums. The flowcharts in FIGS. 14A and 14B illustrate processing for all colors. Therefore, in step S1203, the control unit 54 stores ty, tm, tc, and tbk as reference values.

In step S1212, the control unit 54 performs respective operations of dty, dtm, dtc, and dtbk. In steps S1213 to S1224, the control unit 54 performs color misregistration correction control for respective colors so as to return the color misregistration amount to the reference state similar to steps S713 to S715.

A modified exemplary embodiment will be described below. In each of the above-described exemplary embodiments, the control unit 54 performs processing for acquiring reference values to be used as criterions for determining the color misregistration state each time. However, when returning from a high internal temperature state to the normal internal temperature state, it is not necessary to perform the reference value acquisition processing if an almost fixed mechanical state is resumed. Instead of the above-described reference values, predetermined reference values (reference states) known in the design or manufacture stage may be used. These predetermined reference states (target in correction of the color misregistration state) are stored, for example, in the EEPROM 324 (see FIG. 5A to 5C) and referred to by the control unit 54. Then, each of the above-described flowcharts are arbitrarily performed by the control unit 54.

With the above-described exemplary embodiments, the color misregistration correction control can be achieved even without transferring toner images (100%-density) for detection (in color misregistration correction control) from the photosensitive drums to the image bearing member (belt). Thus, color misregistration correction control can be performed while maintaining as much usability as possible.

On the other hand, a technique for performing prediction calculation of the color misregistration amount based on an amount of internal temperature change eliminates the need of using toner but has a difficulty in precision. The above-described exemplary embodiments also enable resolving this problem.

The above-described exemplary embodiments provide a shorter wait time till electrostatic latent image detection than the case where toner patterns for color misregistration correction are formed on the intermediate transfer belt.

A method for transferring electrostatic latent images for color misregistration correction onto the intermediate transfer belt needs to increase the value of a time constant ι for the intermediate transfer belt, resulting a disadvantage that image failures are easy to be produced. On the other hand, the above-described exemplary embodiments enable decreasing the value of the time constant ι for the intermediate transfer belt, enabling reducing image failures.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-146194 filed Jun. 30, 2011, which is hereby incorporated by reference herein in its entirety.

What is claimed is:

1. A color image forming apparatus including an image forming unit, wherein the image forming unit includes a rotating photosensitive member, a charging unit configured to charge the photosensitive member, a light irradiation unit configured to perform light irradiation to form an electrostatic latent image on the photosensitive member, a development unit configured to apply toner to the electrostatic latent image to form a toner image on the photosensitive member, and a transfer unit configured to transfer the toner image adhering to the photosensitive member onto a belt, the color image forming apparatus comprising:

a pre-exposure unit configured to be arranged on the downstream side of the transfer unit in a rotational direction of the photosensitive member and to irradiate the photosensitive member surface with light before the photosensitive member surface is charged by the charging unit;

a power supply unit configured to supply power to the charging unit associated with the photosensitive member;

a detection unit configured to detect an output of the power supply unit when an electrostatic latent image for color misregistration correction that is formed on the photosensitive member by the light irradiation performed by the light irradiation unit passes through a position facing the charging unit;

a color misregistration correction control unit configured to control a color misregistration correction based on the result of detection by the detection unit so that a detected color misregistration state at least comes closer to a reference state; and a light amount control unit configured to control a light emission amount of the pre-exposure unit, wherein the light amount control unit performs control such that the pre-exposure unit has a decreased light emission amount when the formed electrostatic latent image for color misregistration correction passes through a position facing the pre-exposure unit before passing through the position facing the charging unit.

2. The color image forming apparatus according to claim 1, further comprising a process unit control unit configured to separate the development unit from a toner image forming position or to set the transfer unit so that the action on the photosensitive member becomes at least smaller than the action at the time of normal toner image formation, and to separate the transfer unit from the toner image forming position or to set the development unit so that the action on the photosensitive member becomes at least smaller than the action at the time of normal toner image formation.

3. The color image forming apparatus according to claim 1, wherein the light amount control unit is configured to, when a position where the electrostatic latent image for color misregistration correction that is formed passes through the position facing the pre-exposure unit and after the electrostatic latent image for color misregistration correction that is formed passes through the position facing the charging unit, cause the pre-exposure unit to perform light re-emission.

4. The color image forming apparatus according to claim 3, wherein, the light irradiation unit is configured to perform, when a pre-exposed and charged photosensitive drum surface position reaches the position of laser irradiation by the light irradiation unit, a subsequent light irradiation.

5. The color image forming apparatus according to claim 1, wherein the light amount control unit decreases the light emission amount of the pre-exposure unit by causing the pre-exposure unit not to perform the light irradiation.

6. The color image forming apparatus according to claim 1, wherein the image forming unit and the power supply unit are respectively provided corresponding to each color.

7. The color image forming apparatus according to claim 1, wherein the light amount control unit performs control such that the pre-exposure unit has a decreased light emission amount compared to that in normal image formation when the electrostatic latent image for color misregistration correction passes through the position facing the pre-exposure unit before passing through the position facing the charging unit.

8. A method for a color image forming apparatus including an image forming unit, wherein the image forming unit includes a rotating photosensitive member, a charging unit configured to charge the photosensitive member, a light irradiation unit configured to perform light irradiation to form an electrostatic latent image on the photosensitive member, a development unit configured to apply toner to the electrostatic latent image to form a toner image on the photosensitive member, and a transfer unit configured to transfer the toner image adhering to the photosensitive member onto a belt, the color image forming apparatus comprising:

a pre-exposure unit configured to be arranged on the downstream side of the transfer unit in a rotational direction of the photosensitive member and to irradiate the photosensitive member surface with light before the photosensitive member surface is charged by the charging unit;

a detection unit;

a color misregistration correction control unit; and a light amount control unit;

the method comprising:

causing the pre-exposure unit to irradiate the photosensitive member surface with light before the photosensitive member surface is charged by the charging unit;

causing the detection unit to detect an output of a power supply unit when an electrostatic latent image for color misregistration correction that is formed on the photosensitive member by the light irradiation performed by the light irradiation unit passes through a position facing the charging unit;

causing the light amount control unit to control a light emission amount of the pre-exposure unit; and causing the light amount control unit to perform control such that the pre-exposure unit has a decreased light emission amount when the formed electrostatic latent image for color misregistration correction passes through a position facing the pre-exposure unit before passing through the position facing the charging unit.

* * * * *